US011131312B2

(12) United States Patent
McConville et al.

(10) Patent No.: US 11,131,312 B2
(45) Date of Patent: *Sep. 28, 2021

(54) ACTIVE CASING TREATMENT ADAPTED WITH MOVABLE SLEEVE

(71) Applicant: Ford Global Technologies, LLC, Dearborn, MI (US)

(72) Inventors: Gregory McConville, Ann Arbor, MI (US); David Hanna, Troy, MI (US); Liangjun Hu, Bloomfield Hills, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 586 days.

This patent is subject to a terminal disclaimer.

(21) Appl. No.: 15/832,624

(22) Filed: Dec. 5, 2017

(65) Prior Publication Data

US 2019/0170148 A1 Jun. 6, 2019

(51) Int. Cl.
*F04D 27/00* (2006.01)
*F04D 29/40* (2006.01)
(Continued)

(52) U.S. Cl.
CPC .......... *F04D 27/002* (2013.01); *F02B 37/225* (2013.01); *F04D 27/0223* (2013.01);
(Continued)

(58) Field of Classification Search
CPC .. F04D 29/685; F04D 29/4213; F04D 29/403; F04D 27/0246; F04D 27/0223;
(Continued)

(56) References Cited

U.S. PATENT DOCUMENTS 5,295,785 A 3/1994 Church et al.
6,648,594 B1 11/2003 Horner et al.
(Continued)

FOREIGN PATENT DOCUMENTS

CN 105065328 A 11/2015

OTHER PUBLICATIONS

United States Patent Patent and Trademark Office, Office Action Issued in U.S. Appl. No. 15/832,651, dated Oct. 18, 2019, 10 pages.
(Continued)

*Primary Examiner* — Courtney D Heinle
*Assistant Examiner* — Andrew Thanh Bui
(74) *Attorney, Agent, or Firm* — Geoffrey Brumbaugh; McCoy Russell LLP

(57) ABSTRACT

Methods and systems are provided for a compressor adapted with a movable sleeve and an active casing treatment that form separate air flow chambers. In one example, a method includes flowing intake air in a first direction through a casing to an impeller of a compressor, selectively flowing intake air from the casing through a first chamber in an opposite, second direction, the first chamber circumferentially surrounding the casing, and selectively flowing intake air in the first direction through a second chamber to the impeller, the second chamber circumferentially surrounding the first chamber. In this way, compressor surge may be mitigated without reducing compressor efficiency at higher air flow rates.

20 Claims, 9 Drawing Sheets

(51) Int. Cl.
- *F02B 37/22* (2006.01)
- *F04D 27/02* (2006.01)
- *F04D 29/68* (2006.01)
- *F04D 29/42* (2006.01)
- *F02B 37/12* (2006.01)

(52) U.S. Cl.
CPC ....... *F04D 27/0246* (2013.01); *F04D 29/403* (2013.01); *F04D 29/4213* (2013.01); *F04D 29/685* (2013.01); *F02B 2037/125* (2013.01)

(58) Field of Classification Search
CPC .... F04D 27/002; F04D 27/0207; F04D 17/14; F04D 27/001; F04D 27/02; F04D 27/023; F02B 37/225
See application file for complete search history.

(56) References Cited

U.S. PATENT DOCUMENTS

| | | | | |
|---|---|---|---|---|
| 6,813,887 B2* | 11/2004 | Sumser | ................... | F02B 33/44 60/611 |
| 7,350,356 B2 | 4/2008 | Sumser et al. | | |
| 8,061,974 B2 | 11/2011 | Gu et al. | | |
| 8,210,793 B2* | 7/2012 | Hale | ................... | F02C 6/12 415/58.2 |
| 8,322,138 B2* | 12/2012 | Jackson | ................ | F01M 13/022 60/605.1 |
| 8,517,664 B2 | 8/2013 | Sun et al. | | |
| 9,003,791 B2* | 4/2015 | Ibaraki | ....................... | F02C 3/34 60/603 |
| 9,528,527 B2* | 12/2016 | Sekularac | ........... | F04D 27/0215 |
| 9,719,518 B2 | 8/2017 | Mohtar et al. | | |
| 9,951,793 B2* | 4/2018 | Lucas | ................... | F04D 29/681 |
| 10,436,211 B2* | 10/2019 | McArdle | ............... | F04D 29/685 |
| 10,851,794 B2* | 12/2020 | Hanna | .................. | F02B 37/225 |
| 2016/0160756 A1 | 6/2016 | McGahey et al. | | |
| 2019/0186502 A1* | 6/2019 | Hu | ........................ | F04D 27/009 |

OTHER PUBLICATIONS

Li, X. et al., "Flow Control by Slot Position and Noise Baffle in a Self-Recirculation Casing Treatment on an Axial Fan-Rotor," Hindawi: International Journal of Rotating Machinery, vol. 2017, Article ID 9509212, Jan. 11, 2017, 19 pages.

Zeng, T. et al., "Systems and Method for a Variable Inlet Device of a Compressor," U.S. Appl. No. 15/701,050, filed Sep. 11, 2017, 67 pages.

Zeng, T. et al., "Systems and Method for a Variable Inlet Device of a Compressor," U.S. Appl. No. 15/700,995, filed Sep. 11, 2017, 67 pages.

Hanna, D. et al., "Active Casing Treatment Adapted With Movable Sleeve," U.S. Appl. No. 15/832,651, filed Dec. 5, 2017, 64 pages.

* cited by examiner

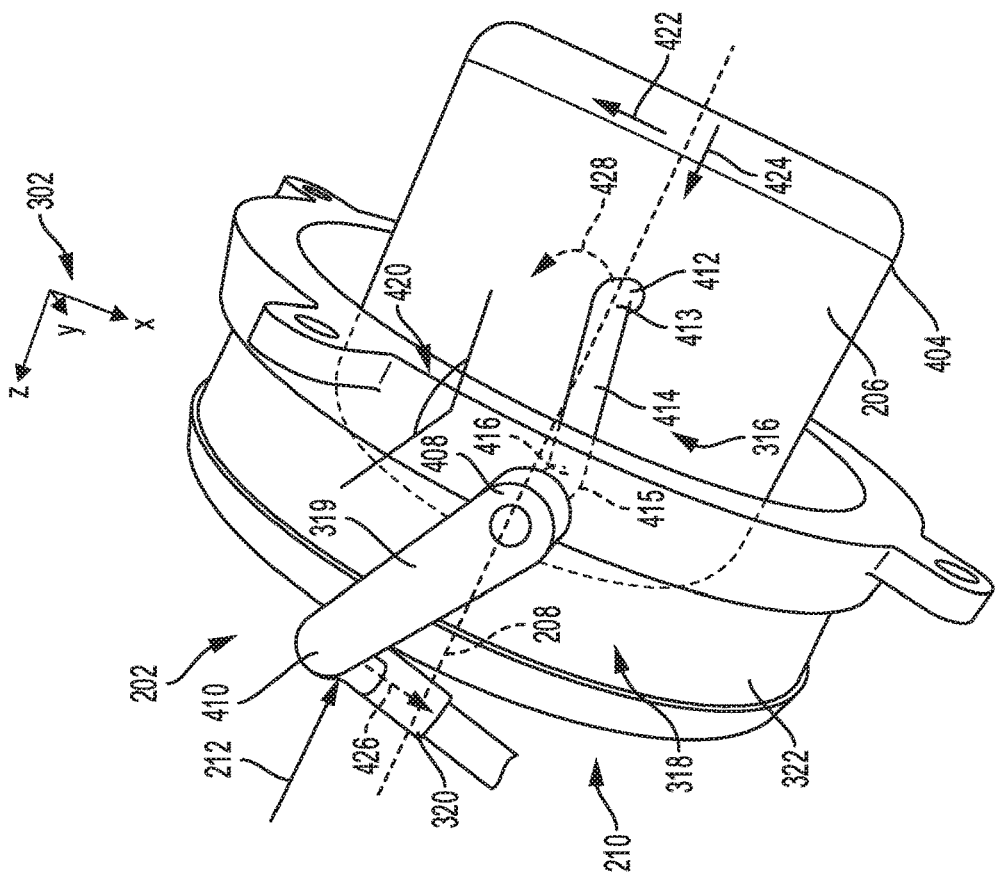
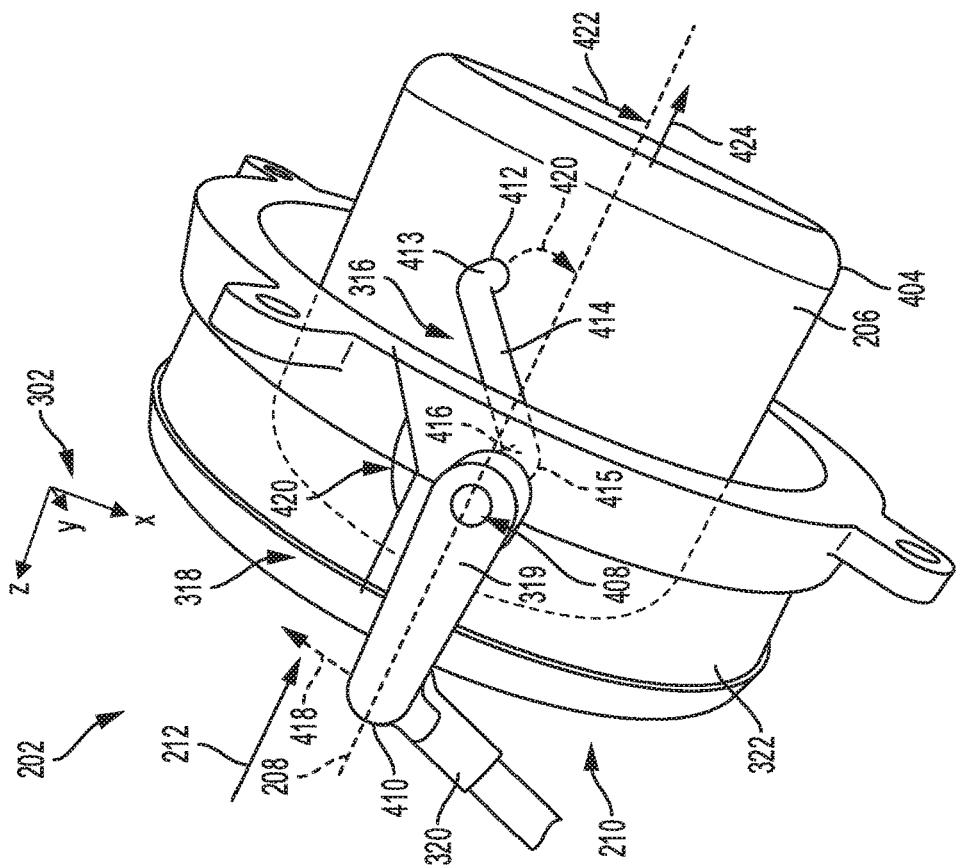
FIG. 4A
FIG. 4B

ACTIVE CASING TREATMENT ADAPTED WITH MOVABLE SLEEVE

FIELD

The present description relates generally to methods and systems for controlling a vehicle engine to reduce noise emitted during surge recirculation flow.

BACKGROUND/SUMMARY

By incorporating a turbocharger into an engine of a vehicle, the efficiency and power output of the engine may be improved. The forced induction of extra air into a combustion chamber of the engine proportionally induces the combustion of additional fuel, thereby producing more power than obtained from air intake at ambient pressure. The turbocharger may include an exhaust driven turbine coupled to a compressor via a drive shaft. The compressor may be fluidly coupled to an air intake manifold in the engine connected to a plurality of engine cylinders which, during combustion, produces exhaust gas that may be directed to a turbine wheel, driving the rotation of the turbine and, in turn, the rotation of the compressor. The use of a compressor allows a smaller displacement engine to provide as much power as a larger displacement engine, but with additional fuel economy benefits.

However, compressors are prone to surge and choke. For example, when an operator tips-out of an accelerator pedal, air flow decreases, leading to reduced forward flow through the compressor at high pressure ratio (PR), possibly leading to compressor surge. In another example, surge may be caused in part by high levels of cooled exhaust gas recirculation (EGR) which increase compressor pressure while decreasing mass flow through the compressor. Compressor surge can lead to NVH issues such as undesirable noise from the engine intake system.

Compressor choke may be encountered at high flows, when an increase in compressor speed gives a diminishing increase in the rate of flow. When the flow at any point in the compressor reaches the choke condition, no further flow rate increase is possible. This condition represents the maximum compressor volumetric flow rate as a function of the pressure ratio. Choke occurs when the air flow mass through the compressor cannot be increased for a given speed of the compressor. The flow rate into the compressor may be limited by the size of the compressor inlet, and when the flow at the inlet reaches sonic velocity, the flow may not be increased further. As one example, choke may occur when an operator tips-in from a part load or idle conditions to a high load condition, such as when going uphill with a load.

Various approaches have been developed to address the issue of compressor inefficiency leading to surge including providing a recirculation pathway for gas flow. One example approach is shown by Homer et al. in U.S. Pat. No. 6,648,594 B1. Therein, a compressor housing forming an active casing treatment having a plurality of bypass channels, acting as short cuts for air flow, is disclosed. The channels are fluidly connected to an air intake gallery separated from the main air inlet of the compressor by the compressor housing. Air flow through the channels is controlled by a slidable or rotatable sleeve. To reduce compressor surge, the sleeve may be adjusted to open a slot that allows recirculation through the air intake gallery to flow air from the compressor wheel to the compressor inlet. At high engine speeds, additional air may enter the compressor through the air intake gallery to reach the compressor wheel, thereby preventing engine choke.

However, the inventors herein have recognized potential issues with such systems. As one example, undesirable noise arising from oscillations of air flow may occur during light engine loads near the surge limit. The noise may be suppressed by providing a recirculation path in the active casing treatment adapted with dampening elements such as deflectors or baffles. The incorporation of such structures in the recirculation path, however, hinders air flow during high engine operating loads near or in a choke region of compressor operation. High volume air flow through the flow path in an opposite direction from surge recirculation flow is desirable for preventing turbocharger choke but the presence of noise suppressing elements may restrict flow so that the response of the active casing treatment to avoid conditions leading to compressor choke is less efficient.

Another potential issue with active casing treatments as described above arises from instances where the movable sleeve may become stuck. Over time, particulates and other matter may infiltrate the space between the movable sleeve and compressor casing resulting in the binding of the sleeve to the casing and hindering the operation of the sleeve. This may result in unstable operation of the compressor, and, depending on the position in which the sleeve is immobilized, may increase the likelihood of turbocharger surge or choke.

In one example, the issues described above may be addressed by a method including flowing intake air in a first direction through a casing to an impeller of a compressor, selectively flowing intake air from the casing through a first chamber in an opposite, second direction, the first chamber circumferentially surrounding the casing, and selectively flowing intake air in the first direction through a second chamber to the impeller, the second chamber circumferentially surrounding the first chamber. In this way, noise produced during low engine speeds and light engine loads may be minimized without adversely affecting high volume flow during heavy engine loads.

As one example, an active casing treatment for a compressor inlet is configured with a movable sleeve. By sliding the sleeve axially along a compressor casing in which the active casing treatment is arranged, the sleeve may alternate between opening a bleed port while closing an injection port of the active casing treatment, or closing the bleed port while opening the injection port. The bleed port includes an opening to a first chamber arranged between the compressor casing and the movable sleeve while the injection port includes an opening to a second chamber disposed between the movable sleeve and the compressor housing. The bleed port fluidly couples the first chamber to an inner passage of air flow through the compressor inlet. Similarly, the injection port fluidly couples the second chamber to the inner passage of the compressor inlet. The first chamber may include noise deflectors or baffles to mitigate noise due to surge flow, while such structures may not be present in the second chamber.

The movement of the sleeve is controlled by an actuating mechanism that shifts the sleeve axially, to adjust flow between the bleed port and injection port. The mechanism may also move the sleeve rotationally to prevent binding of the sleeve to the compressor casing. The actuating mechanism may be configured with a linkage that enables the motor of the actuating mechanism to be positioned external to the compressor housing while still engaging the movement of the movable sleeve. The motion of the linkage, as controlled by the motor, is translated into the adjustment of the movable sleeve with respect to the positions of the bleed port and the injection port.

In this way, by providing separate circulation pathways for compressor operation outside of surge and choke limits, unwanted noise during light engine operations may be effectively dampened without lowering compressor efficiency during higher end engine operations. Adhering of the sleeve to the compressor casing is prevented by minimizing the interfacing contact surface to that formed by 3 or more ribs spaced circumferentially around the casing and the continuous surface at the end that covers the ports. The axial contact length of the ribs provides stability to prevent the sleeve from misaligning on the casing and becoming bound up. The relatively small contact area inhibits the accumulation of matter between the sleeve and the casing. The technical effect of configuring an active casing treatment with separate surge and choke circulation paths is that extension of surge and choke limits is maintained while additional features of the active casing treatment are included, such as noise suppression.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 4A shows a side view of a movable sleeve connected to a linkage of a rotary actuator, in a first position.

FIG. 4B shows a side view of a movable sleeve connected to linkage of a rotary actuator, in a second position.

FIGS. 2-4B are shown approximately to scale.

DETAILED DESCRIPTION

Figure 1:
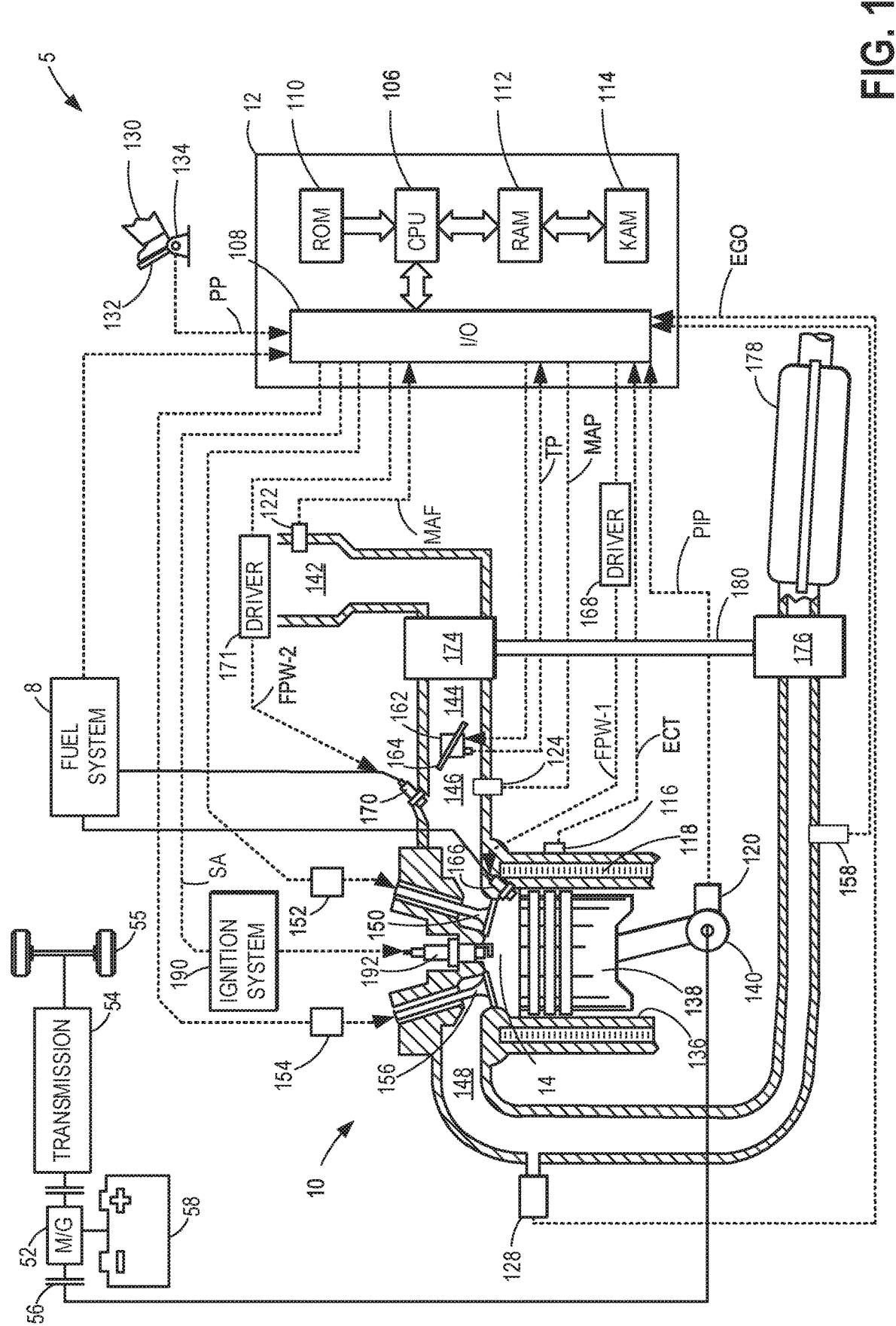
FIG. 1 shows an example engine system for a vehicle.
Figure 2A:
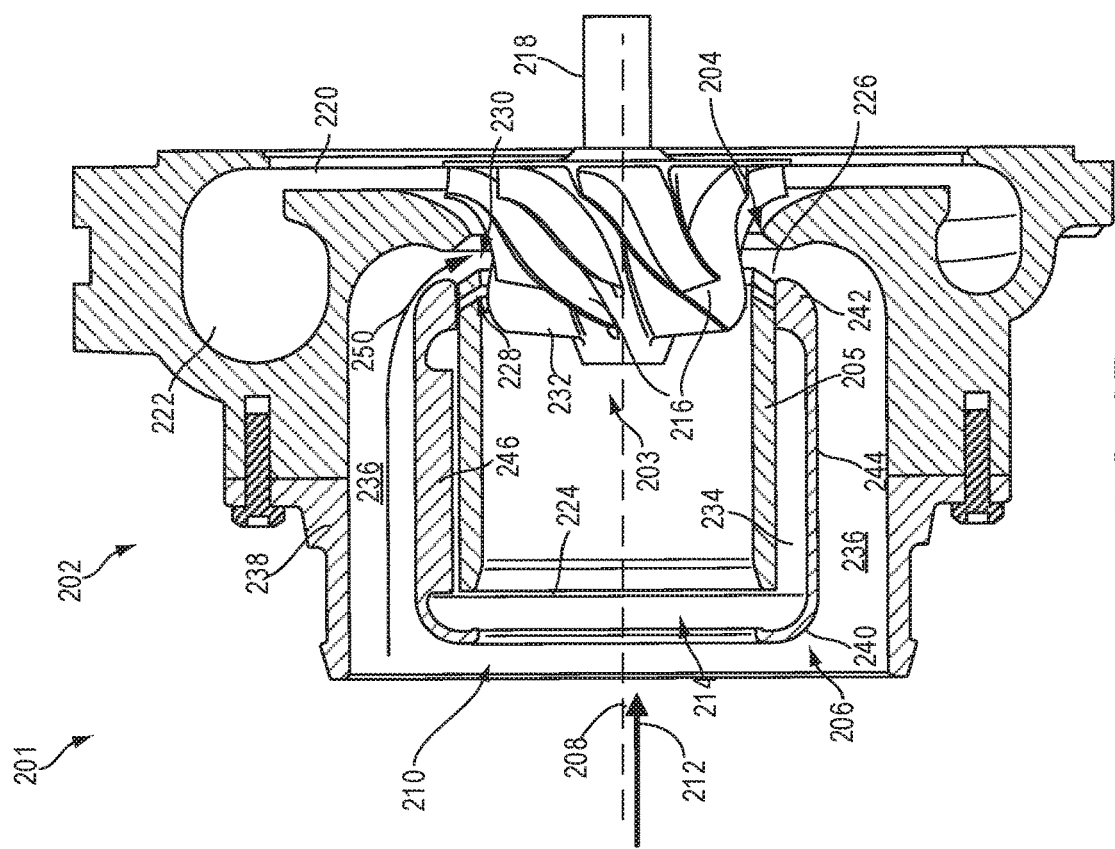
FIG. 2A shows a cut-out view of a compressor inlet with an active casing treatment and movable sleeve with a bleed port open to flow.
Figure 2B:
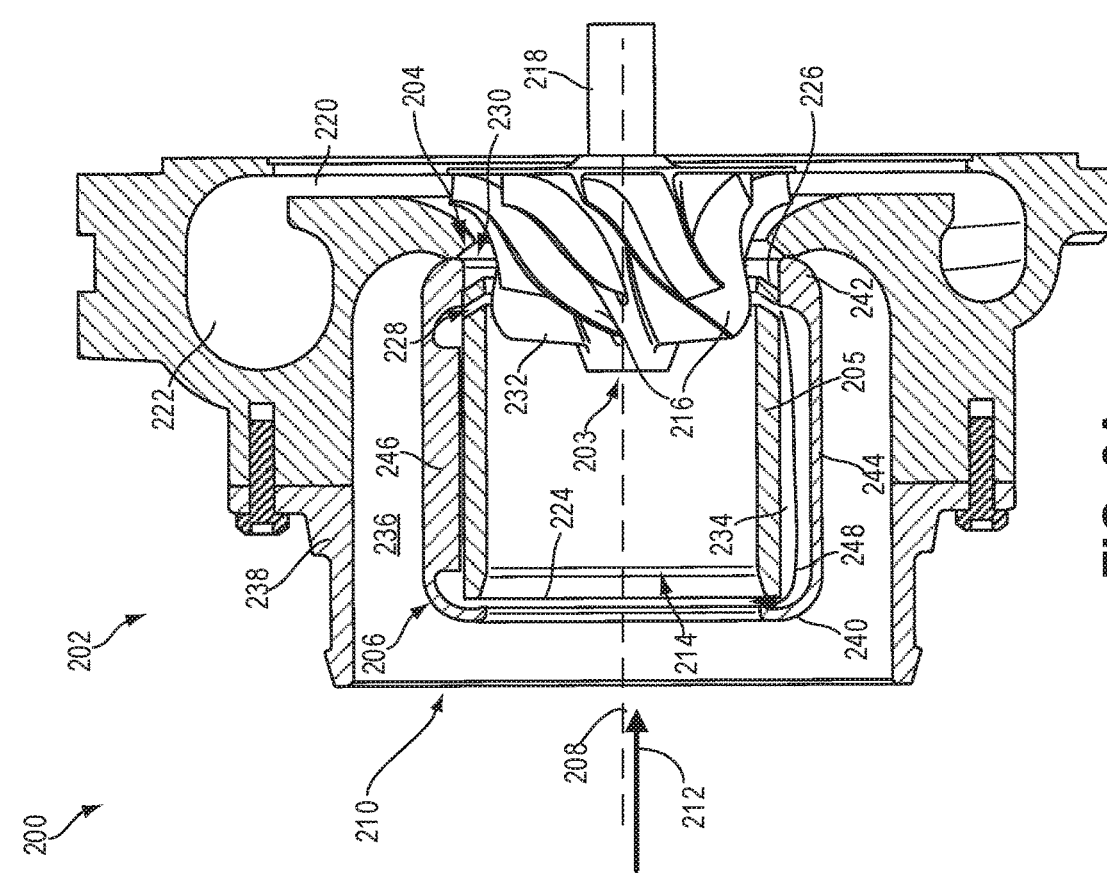
FIG. 2B shows a cut-out view of a compressor inlet with an active casing treatment and movable sleeve with an injection port open to flow.
Figure 5:
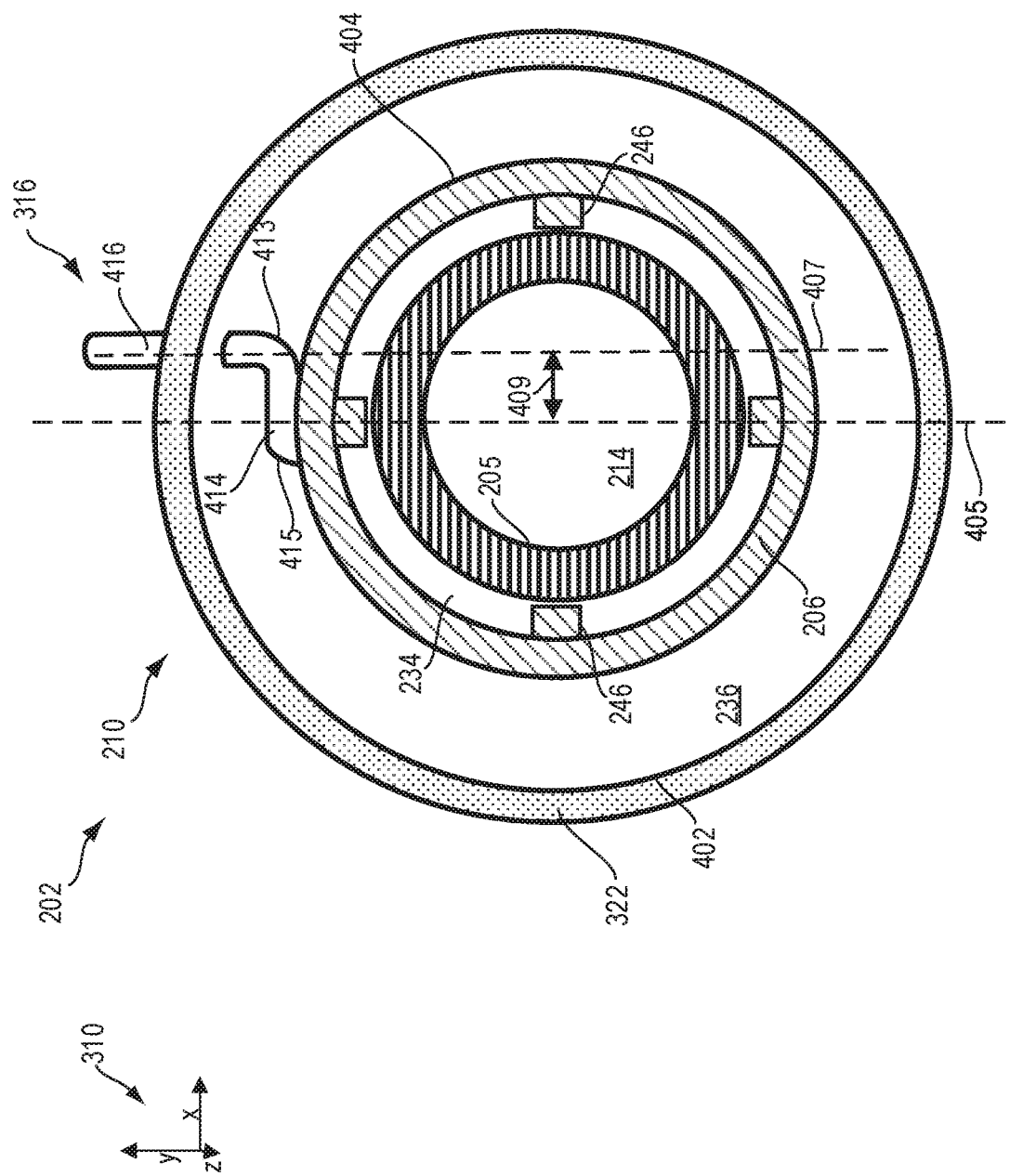
FIG. 5 shows a front view of a compressor inlet with a movable sleeve connected to a first branch of a linkage of a rotary actuator.
Figure 6A:
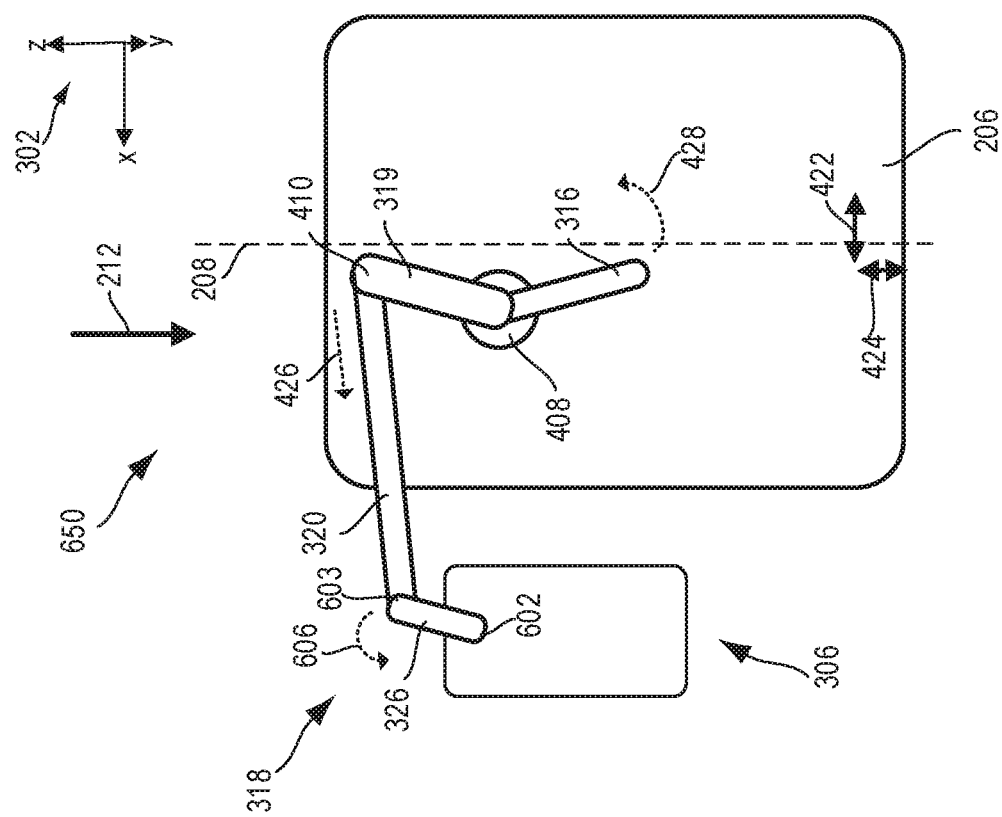
FIG. 6A shows a schematic illustration of a movable sleeve connected to a rotary actuator via a linkage, in a first position.
Figure 6B:
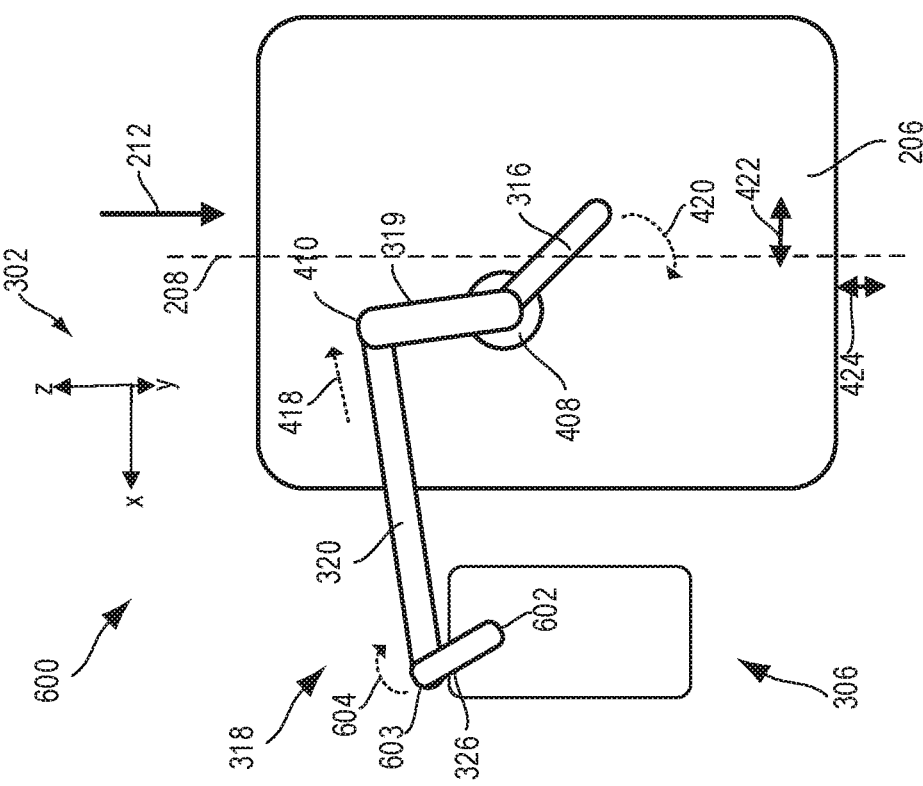
FIG. 6B shows a schematic illustration of a movable sleeve connected to a rotary actuator via a linkage, in a second position.
Figure 7B:
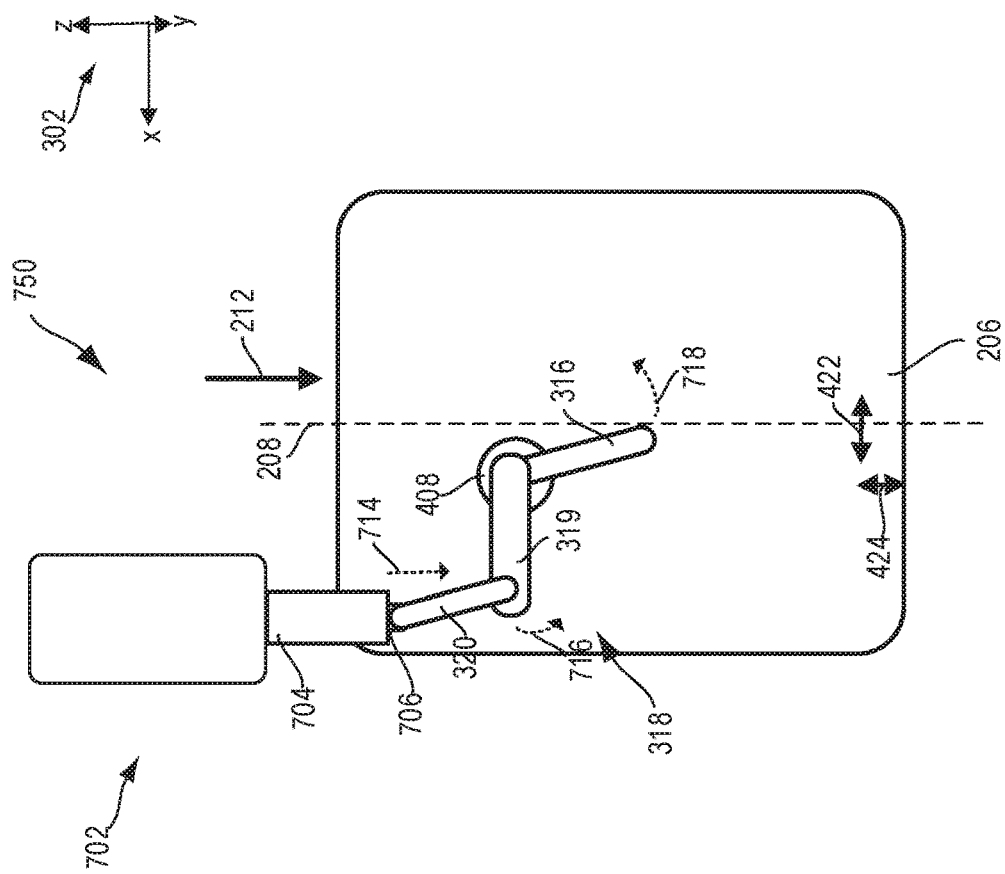
FIG. 7B shows a schematic illustration of a movable sleeve connected to a linear actuator via a linkage, in a second position.
Figure 7A:
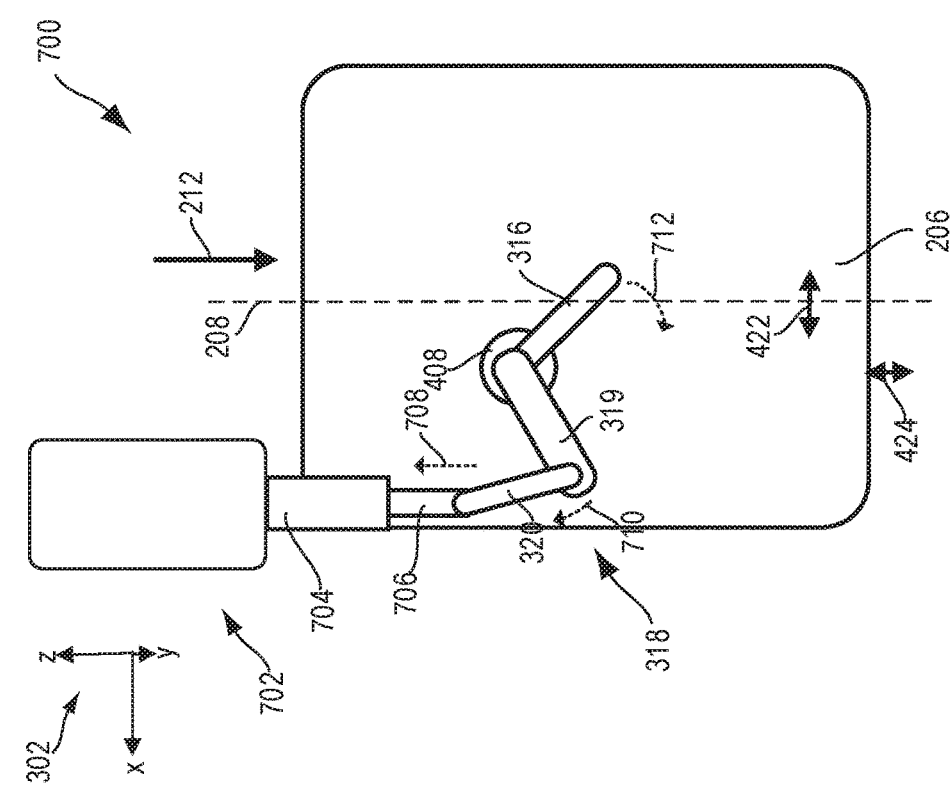
FIG. 7A shows a schematic illustration of a movable sleeve connected to a linear actuator via a linkage, in a first position.
Figure 8:
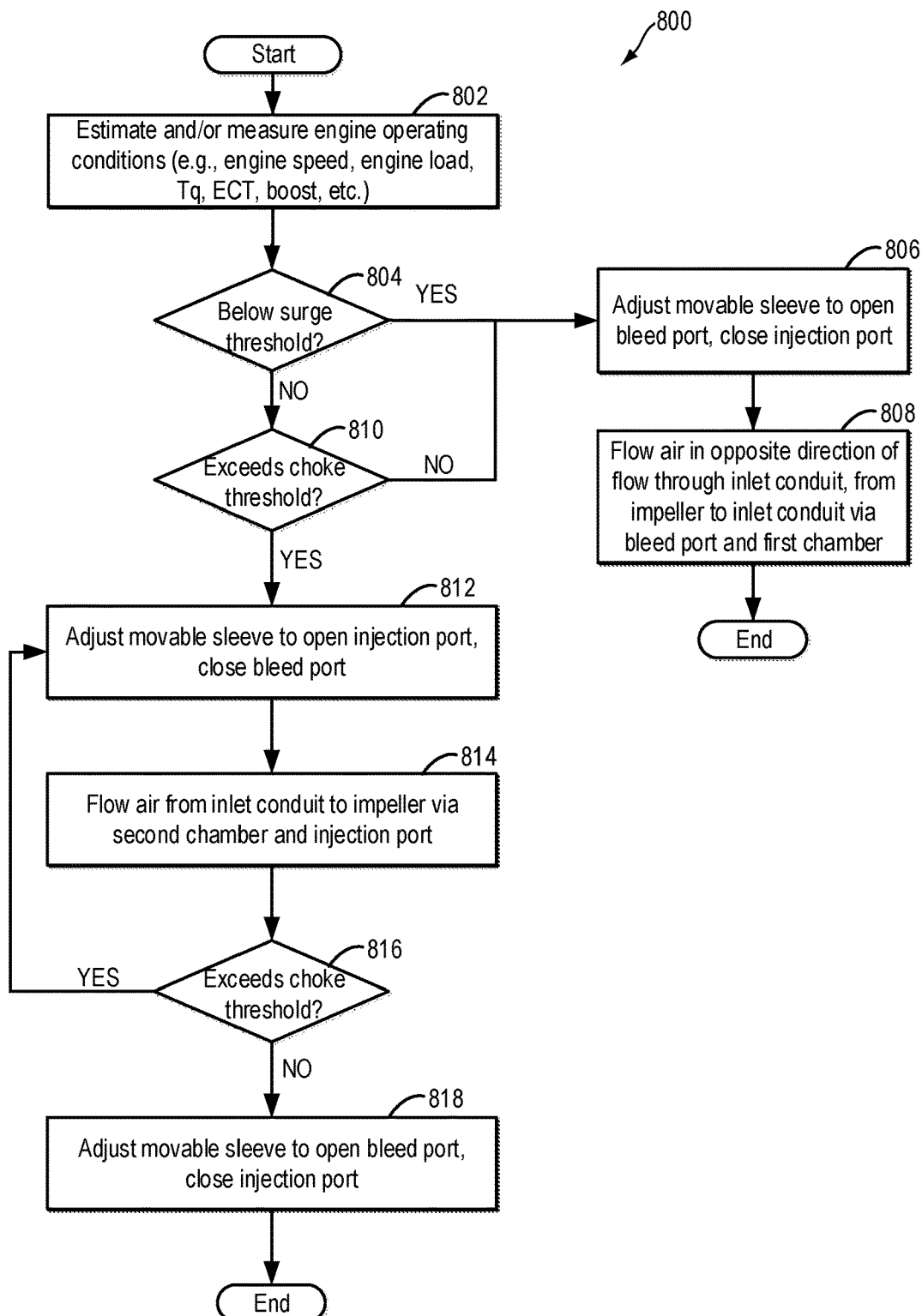
FIG. 8 depicts a flow chart of an example method for operation of an active casing treatment coupled with a movable sleeve.

The following description relates to systems and methods for controlling operation of a turbocharger compressor's active casing treatment to reduce surge and choke occurrence. One non-limiting embodiment of a hybrid vehicle system including a turbocharged engine is shown in FIG. 1. The turbocharged engine may utilize an exhaust turbine-driven compressor that may be positioned in an intake passage of the engine. The compressor may include an outer housing with an inlet conduit (e.g., intake passage) enclosing a casing and an impeller (e.g., compressor wheel) disposed at a downstream end of the casing, as illustrated in FIGS. 2A-2B. The impeller may include one or more blades and is rotatable about a central axis of the compressor. The compressor may be adapted with an active casing treatment including a plurality of ports disposed in a wall of the casing providing alternate pathways for air circulation to avoid compressor surge and choke. A movable sleeve, configured to slide axially to align with each of the plurality of ports, may circumferentially surround the casing disposed in the inlet conduit. A first chamber, coupled to a bleed port of the active casing treatment, is arranged between an inner surface of the movable sleeve and an outer surface of the compressor casing and may constitute a first circulation path for air recirculation during light engine loads. A second chamber, coupled to an injection port of the active casing treatment, may be formed between an outer surface of the movable sleeve and an inner surface of the compressor housing, acting as a second circulation pathway for injection of air to an outlet end of the compressor during high engine loads. The sliding of the movable sleeve may be controlled by an actuating mechanism shown in FIG. 3 that includes a connecting element, or linkage, that drives an axial and rotational movement of the movable sleeve. The pivoting of the linkage, translated into the axial and rotational sliding of the movable sleeve, is depicted in FIGS. 4A and 4B. The attachment of the linkage, relative to a central axis of the compressor, to an outer surface of the moveable sleeve is shown in FIG. 5 from a front view. The adjustment of the moveable sleeve as performed by a rotary actuator between a first position and a second position is shown in FIGS. 6A-6B. A linear actuator may similarly slide the moveable sleeve between the first and second position, as depicted in FIGS. 7A-7B. As shown in FIG. 8, the positioning of the movable sleeve with respect to the plurality of ports may be controlled based on compressor surge and choke conditions, for example according to a compressor map shown in FIG. 9. In this way, an active casing treatment adapted with a movable sleeve may be used to reduce unwanted noise during light engine loads in addition to circumventing engine surge and choke.

Figure 9:
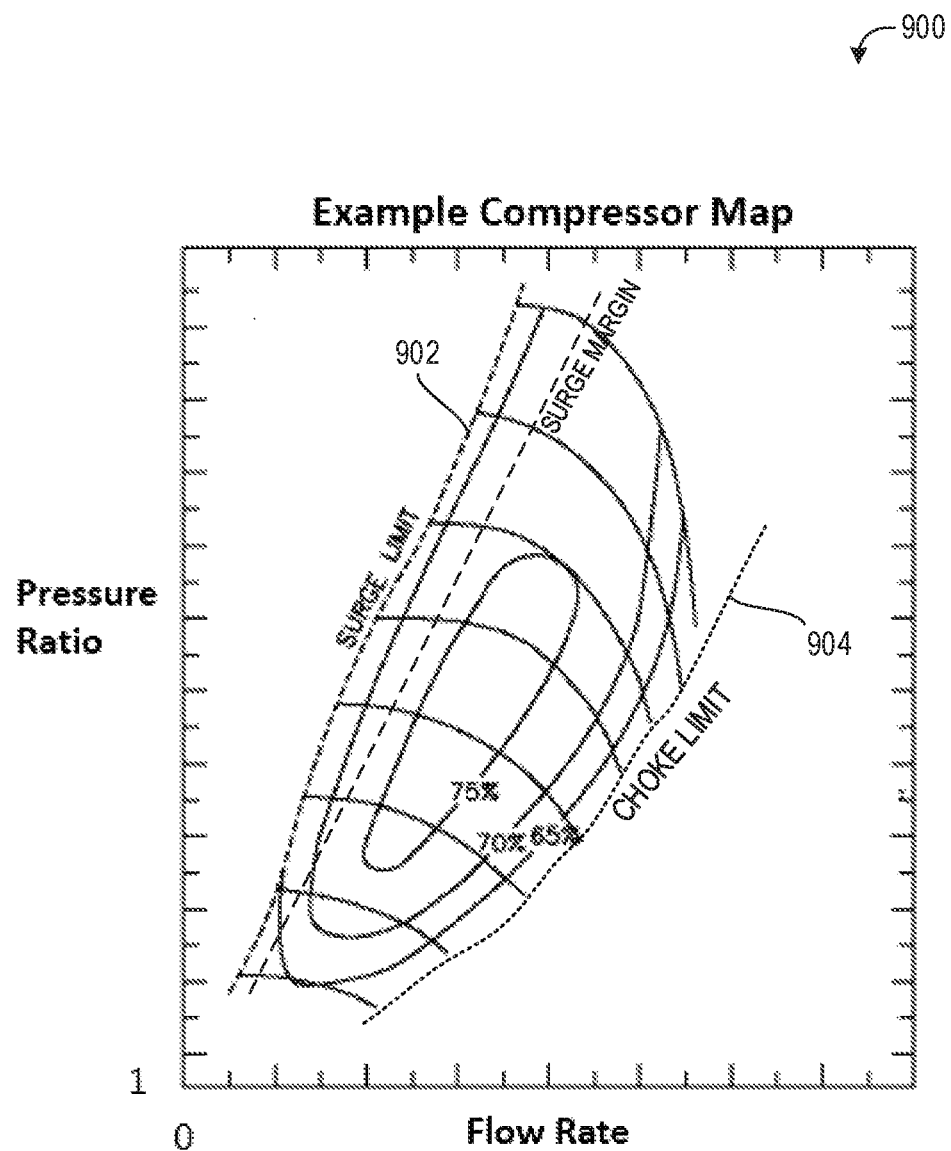
FIG. 9 shows an example compressor map.

Compressor operator limits will be referred to throughout the following detailed descriptions and may be clarified in conjunction with a compressor map illustrated in FIG. 9 showing flow rate through the compressor as a function of a pressure ratio across the compressor. A surge limit delineates a lower limit air flow for compressor operation while a choke limit defines an upper limit air flow. For example, dashed line 902 represents a lower limit boundary that is the surge limit and an upper limit boundary, indicated by dashed line 904, represents the choke limit. Compressor surge may occur during low compressor flow conditions, such as rapid engine unloading events, during which the turbine continues to spin at a relatively high speed, pressurizing the air downstream of the compressor. This leads to a high pressure zone at the outlet of the compressor, driving a reversal in the air flow direction that may cause degradation of the turbocharger. Compressor operating efficiency—as depicted by the curved lines marked with percentages—reduces as the operating point nears the surge limit. Operating in the region to the left of dashed line 902 may (e.g., with relatively low compressor mass flow and mid-to-high pressure ratio) result in compressor surge and even lower efficiency. Moving the surge line to the left can increase the compressor operating efficiency of a given operating point.

Operation beyond the upper limiting boundary of compressor pressure ratio relative to mass flow (e.g. in a region to the right of dashed line 904 defined by relatively high compressor mass flow and relatively low pressure ratio) results in turbocharger choke. Choke may occur during transient over speed events where, for example, an increase in engine load subjects the turbocharger to flow beyond the tolerance of the turbocharger. The rotational speed of the turbine driving the compressor may be higher than the maximum design speed of the turbo. Repeated instances of turbocharger choke may also cause degradation of the turbocharger and/or limit engine torque.

Turning now to FIG. 1, an example of a cylinder 14 of an internal combustion engine 10 is illustrated, which may be included in a vehicle 5. Engine 10 may be controlled at least partially by a control system, including a controller 12, and by input from a vehicle operator 130 via an input device 132. In this example, input device 132 includes an accelerator pedal and a pedal position sensor 134 for generating a proportional pedal position signal PP. Cylinder (herein, also "combustion chamber") 14 of engine 10 may include combustion chamber walls 136 with a piston 138 positioned therein. Piston 138 may be coupled to a crankshaft 140 so that reciprocating motion of the piston is translated into rotational motion of the crankshaft. Crankshaft 140 may be coupled to at least one drive wheel 55 of the passenger vehicle via a transmission 54, as described further below. Further, a starter motor (not shown) may be coupled to crankshaft 140 via a flywheel to enable a starting operation of engine 10.

In some examples, vehicle 5 may be a hybrid vehicle with multiple sources of torque available to one or more vehicle wheels 55. In other examples, vehicle 5 is a conventional vehicle with only an engine. In the example shown, vehicle 5 includes engine 10 and an electric machine 52. Electric machine 52 may be a motor or a motor/generator. Crankshaft 140 of engine 10 and electric machine 52 are connected via transmission 54 to vehicle wheels 55 when one or more clutches 56 are engaged. In the depicted example, a first clutch 56 is provided between crankshaft 140 and electric machine 52, and a second clutch 56 is provided between electric machine 52 and transmission 54. Controller 12 may send a signal to an actuator of each clutch 56 to engage or disengage the clutch, so as to connect or disconnect crankshaft 140 from electric machine 52 and the components connected thereto, and/or connect or disconnect electric machine 52 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 52 receives electrical power from a traction battery 58 to provide torque to vehicle wheels 55. Electric machine 52 may also be operated as a generator to provide electrical power to charge battery 58, for example, during a braking operation.

Cylinder 14 of engine 10 can receive intake air via a series of intake air passages 142, 144, and 146. Intake air passage 146 can communicate with other cylinders of engine 10 in addition to cylinder 14. In some examples, one or more of the intake passages may include a boosting device, such as a turbocharger or a supercharger. For example, FIG. 1 shows engine 10 configured with a turbocharger, including a compressor 174 arranged between intake passages 142 and 144 and an exhaust turbine 176 arranged along an exhaust passage 148. Compressor 174 may be at least partially powered by exhaust turbine 176 via a shaft 180 when the boosting device is configured as a turbocharger. However, in other examples, such as when engine 10 is provided with a supercharger, compressor 174 may be powered by mechanical input from a motor or the engine and exhaust turbine 176 may be optionally omitted.

A throttle 162 including a throttle plate 164 may be provided in the engine intake passages for varying the flow rate and/or pressure of intake air provided to the engine cylinders. For example, throttle 162 may be positioned downstream of compressor 174, as shown in FIG. 1, or may be alternatively provided upstream of compressor 174.

Exhaust passage 148 can receive exhaust gases from other cylinders of engine 10 in addition to cylinder 14. An exhaust gas sensor 128 is shown coupled to exhaust passage 148 upstream of an emission control device 178. Exhaust gas sensor 128 may be selected from among various suitable sensors for providing an indication of exhaust gas air/fuel ratio (AFR), such as a linear oxygen sensor or UEGO (universal or wide-range exhaust gas oxygen), a two-state oxygen sensor or EGO (as depicted), a HEGO (heated EGO), a NOx, a HC, or a CO sensor, for example. Emission control device 178 may be a three-way catalyst, a NOx trap, various other emission control devices, or combinations thereof.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some examples, each cylinder of engine 10, including cylinder 14, may include at least two intake poppet valves and at least two exhaust poppet valves located at an upper region of the cylinder. Intake valve 150 may be controlled by controller 12 via an actuator 152. Similarly, exhaust valve 156 may be controlled by controller 12 via an actuator 154. The positions of intake valve 150 and exhaust valve 156 may be determined by respective valve position sensors (not shown).

During some conditions, controller 12 may vary the signals provided to actuators 152 and 154 to control the opening and closing of the respective intake and exhaust valves. The valve actuators may be of an electric valve actuation type, a cam actuation type, or a combination thereof. The intake and exhaust valve timing may be controlled concurrently, or any of a possibility of variable intake cam timing, variable exhaust cam timing, dual independent variable cam timing, or fixed cam timing may be used. Each cam actuation system may include one or more cams and may utilize one or more of cam profile switching (CPS), variable cam timing (VCT), variable valve timing (VVT), and/or variable valve lift (VVL) systems that may be operated by controller 12 to vary valve operation. For example, cylinder 14 may alternatively include an intake valve controlled via electric valve actuation and an exhaust valve controlled via cam actuation, including CPS and/or VCT. In other examples, the intake and exhaust valves may be controlled by a common valve actuator (or actuation system) or a variable valve timing actuator (or actuation system).

Cylinder 14 can have a compression ratio, which is a ratio of volumes when piston 138 is at bottom dead center (BDC) to top dead center (TDC). In one example, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some examples, each cylinder of engine 10 may include a spark plug 192 for initiating combustion. An ignition system 190 can provide an ignition spark to combustion chamber 14 via spark plug 192 in response to a spark advance signal SA from controller 12, under select operating modes. A timing of signal SA may be adjusted based on engine operating conditions and driver torque demand. For example, spark may be provided at maximum brake torque (MBT) timing to maximize engine power and efficiency. Controller 12 may input engine operating conditions, including engine speed, engine load, and exhaust gas AFR, into a look-up table and output the corresponding MBT timing for the input engine operating conditions. In other examples the engine may ignite the charge by compression as in a diesel engine.

In some examples, each cylinder of engine 10 may be configured with one or more fuel injectors for providing fuel thereto. As a non-limiting example, cylinder 14 is shown including a fuel injector 166. Fuel injector 166 may be configured to deliver fuel received from a fuel system 8. Fuel system 8 may include one or more fuel tanks, fuel pumps, and fuel rails. Fuel injector 166 is shown coupled directly to cylinder 14 for injecting fuel directly therein in proportion to the pulse width of a signal FPW-1 received from controller 12 via an electronic driver 168. In this manner, fuel injector 166 provides what is known as direct injection (hereafter also referred to as "DI") of fuel into cylinder 14. While FIG. 1 shows fuel injector 166 positioned to one side of cylinder 14, fuel injector 166 may alternatively be located overhead of the piston, such as near the position of spark plug 192. Such a position may increase mixing and combustion when operating the engine with an alcohol-based fuel due to the lower volatility of some alcohol-based fuels. Alternatively, the injector may be located overhead and near the intake valve to increase mixing. Fuel may be delivered to fuel injector 166 from a fuel tank of fuel system 8 via a high pressure fuel pump and a fuel rail. Further, the fuel tank may have a pressure transducer providing a signal to controller 12.

Fuel injector 170 is shown arranged in intake passage 146, rather than in cylinder 14, in a configuration that provides what is known as port fuel injection (hereafter referred to as "PFI") into the intake port upstream of cylinder 14. Fuel injector 170 may inject fuel, received from fuel system 8, in proportion to the pulse width of signal FPW-2 received from controller 12 via electronic driver 171. Note that a single driver 168 or 171 may be used for both fuel injection systems, or multiple drivers, for example driver 168 for fuel injector 166 and driver 171 for fuel injector 170, may be used, as depicted.

In an alternate example, each of fuel injectors 166 and 170 may be configured as direct fuel injectors for injecting fuel directly into cylinder 14. In still another example, each of fuel injectors 166 and 170 may be configured as port fuel injectors for injecting fuel upstream of intake valve 150. In yet other examples, cylinder 14 may include only a single fuel injector that is configured to receive different fuels from the fuel systems in varying relative amounts as a fuel mixture, and is further configured to inject this fuel mixture either directly into the cylinder as a direct fuel injector or upstream of the intake valves as a port fuel injector.

Fuel may be delivered by both injectors to the cylinder during a single cycle of the cylinder. For example, each injector may deliver a portion of a total fuel injection that is combusted in cylinder 14. Further, the distribution and/or relative amount of fuel delivered from each injector may vary with operating conditions, such as engine load, knock, and exhaust temperature, such as described herein below. The port injected fuel may be delivered during an open intake valve event, closed intake valve event (e.g., substantially before the intake stroke), as well as during both open and closed intake valve operation. Similarly, directly injected fuel may be delivered during an intake stroke, as well as partly during a previous exhaust stroke, during the intake stroke, and partly during the compression stroke, for example. As such, even for a single combustion event, injected fuel may be injected at different timings from the port and direct injector. Furthermore, for a single combustion event, multiple injections of the delivered fuel may be performed per cycle. The multiple injections may be performed during the compression stroke, intake stroke, or any appropriate combination thereof.

Fuel injectors 166 and 170 may have different characteristics. These include differences in size, for example, one injector may have a larger injection hole than the other. Other differences include, but are not limited to, different spray angles, different operating temperatures, different targeting, different injection timing, different spray characteristics, different locations etc. Moreover, depending on the distribution ratio of injected fuel among injectors 170 and 166, different effects may be achieved.

Fuel tanks in fuel system 8 may hold fuels of different fuel types, such as fuels with different fuel qualities and different fuel compositions. The differences may include different alcohol content, different water content, different octane, different heats of vaporization, different fuel blends, and/or combinations thereof etc. One example of fuels with different heats of vaporization could include gasoline as a first fuel type with a lower heat of vaporization and ethanol as a second fuel type with a greater heat of vaporization. In another example, the engine may use gasoline as a first fuel type and an alcohol containing fuel blend such as E85 (which is approximately 85% ethanol and 15% gasoline) or M85 (which is approximately 85% methanol and 15% gasoline) as a second fuel type. Other feasible substances include water, methanol, a mixture of alcohol and water, a mixture of water and methanol, a mixture of alcohols, etc.

Controller 12 is shown in FIG. 1 as a microcomputer, including a microprocessor unit 106, input/output ports 108, an electronic storage medium for executable programs (e.g., executable instructions) and calibration values shown as non-transitory read-only memory chip 110 in this particular example, random access memory 112, keep alive memory 114, and a data bus. Controller 12 may receive various signals from sensors coupled to engine 10, including signals previously discussed and additionally including a measurement of inducted mass air flow (MAF) from a mass air flow sensor 122; an engine coolant temperature (ECT) from a temperature sensor 116 coupled to a cooling sleeve 118; an exhaust gas temperature from a temperature sensor 158 coupled to exhaust passage 148; a profile ignition pickup signal (PIP) from a Hall effect sensor 120 (or other type)

coupled to crankshaft 140; throttle position (TP) from a throttle position sensor; signal EGO from exhaust gas sensor 128, which may be used by controller 12 to determine the AFR of the exhaust gas; and an absolute manifold pressure signal (MAP) from a MAP sensor 124. An engine speed signal, RPM, may be generated by controller 12 from signal PIP. The manifold pressure signal MAP from MAP sensor 124 may be used to provide an indication of vacuum or pressure in the intake manifold. Controller 12 may infer an engine temperature based on the engine coolant temperature and infer a temperature of catalyst 178 based on the signal received from temperature sensor 158.

Controller 12 receives signals from the various sensors of FIG. 1 and employs the various actuators of FIG. 1 to adjust engine operation based on the received signals and instructions stored on a memory of the controller. For example, upon receiving signals from various sensors, the engine controller may send control signals to an actuator to shift the position of a movable sleeve relative to an active casing treatment. The signal may tell an actuator of the movable sleeve, arranged along an inlet conduit of the compressor 174 to open or close a plurality of ports disposed in the active casing treatment (as explained further below with reference to FIG. 8) in response to a current engine speed and engine load relative to a surge threshold and/or choke threshold of the compressor.

As described above, FIG. 1 shows only one cylinder of a multi-cylinder engine. As such, each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1 with reference to cylinder 14.

The performance of an engine may be tied to the efficiency of a compressor, with reference to engine 10 and compressor 174 of FIG. 1. The ability of the compressor to operate between a surge threshold and a choke threshold may affect the stability of the engine during low speeds as well as the power output derived from combustion of boosted air. As such, an active casing treatment, illustrated in detail in FIGS. 2A-2B, may relieve pressure accumulation at the outlet of the compressor during low engine speeds and light operation by recirculating air to the inlet conduit. During heavier loads and higher engine speeds, the active casing treatment may provide an additional channel for air flow to the compressor past the leading edge of the compressor wheel.

A first view 200 of a compressor 202 is shown in FIG. 2A and a second view 201 of the compressor 202 is shown in FIG. 2B. Compressor 202 is a non-limiting example of compressor 174 of FIG. 1. Compressor 202 includes a central axis 208 about which an impeller 203 may be rotated. Central axis 208 may also be a central axis of an inlet conduit 210 of the compressor 202 defined by a housing 238 of the compressor. An air flow (e.g., intake air from an intake passage such as intake passage 142 of FIG. 1) into the compressor 202 via the inlet conduit 210 is indicated by an arrow 212 which may also be a reference for the positioning of elements relative to one another. An element in the path of air flow relative to a reference point is considered downstream of that reference point and an element before the reference point in the path of air flow is considered upstream of the said reference point. For example, inlet conduit 210 is upstream from impeller 203 and impeller 203 is downstream from inlet conduit 210.

The impeller 203 may have a plurality of impeller blades 216 and may be connected to a turbine, such as turbine 176 of FIG. 1, via a shaft 218 that drives the rotation of the impeller 203. An outlet end of the compressor 202 may be defined as elements of the compressor 202 positioned downstream of a leading edge 232 of the impeller 203. Air that is drawn into the compressor 202 by the rotation of the impeller 203 is accelerated through a diffuser 220 and collected in a volute 222. Deceleration of gas flow in the volute 222 may cause an increase in pressure in the volute 222, resulting in gas flow to the intake manifold.

Compressor 202 may include an active casing treatment 204 and movable sleeve 206. The active casing treatment 204 may include a casing 205 surrounding a portion of the impeller 203 upstream of the leading edge 232 and an inner channel 214 is formed within a cavity of the casing 205. Air flowing into inlet conduit 210 passes through the inner channel 214 of the casing 205 positioned within the inlet conduit 210, centered about the central axis 208, towards a downstream end of the inner channel 214 where the impeller 203 is positioned.

The active casing treatment 204 may comprise a plurality of ports including a bleed port 228 and an injection port 230 positioned downstream of the bleed port 228, forming channels through the casing 205. The casing 205 may be a substantially cylindrical structure with openings at a first end 224 and a second end 226. The bleed port 228 and the injection port 230 are both disposed at the second end 226 of the active casing treatment 204. The bleed port 228 and the injection port 230 may not be continuous around the circumference of the casing, but may be interrupted by one or more ribs 246 connecting the casing upstream of the second end 226 to the outlet end of the compressor housing. As such, each of the bleed port 228 and the injection port 230 may include a plurality of ports arranged around the circumference of the casing 205.

A width of the injection port 230, measured along the central axis 208, may be larger than a width of the bleed port 228. The bleed port 228 and injection port 230 are arranged downstream of the leading edge 232 of the impeller 203 and each port fluidly couples the inner channel 214 of the casing 205 to one of two chambers positioned outside of the casing 205. Specifically, the bleed port 228 fluidly couples the inner channel 214 to a first chamber 234 formed between an outer surface of the casing 205 and an inner surface of the movable sleeve 206. The injection port 230 fluidly couples the inner channel 214 to a second chamber 236 positioned between an outer surface of the movable sleeve 206 and an inner surface of the compressor housing 238.

As elaborated below, during conditions when compressor surge may occur, such as at low mass flow conditions, active casing treatment 204 may enable gas to flow from the second end 226 of inner channel 214 through bleed port 228 into first chamber 234. The gas further continues from first chamber 234 into the first end 224 of inner channel 214. Thus, when the bleed port is open, the flow of gas striking the leading edge 232 of impeller 203 may be greater than the flow of gas through the inner channel 214 to the leading edge 232 without additional air flow through bleed port 228 (e.g., when the bleed port is blocked). The additional flow of recirculating gas may enable the turbocharger compressor to operate with a lower air flow through intake conduit 210 before surge occurs.

The first chamber 234 may comprise noise deflecting elements such as a number of protrusions extending radially from an outer surface of the casing 205 into the first chamber 234. Alternatively, noise produced during recirculation flow may be dampened by a single noise deflector attached to the outer surface of the casing 205 that curves into the path of air flow. In other examples, the noise arising from flow through the first chamber 234 may be reduced by configuring the first chamber 234 with structures that alter a volume of the first chamber 234 or a velocity of air flow therethrough.

During conditions when compressor choke may occur, such as at high mass flow conditions, active casing treatment 204 may enable gas to flow in the same direction as flow through the inner channel 214 but through an alternate pathway via a second chamber 236 and injection port 230 to reach the impeller 203. During high mass flow conditions, a low pressure zone may be present in inner channel 214 downstream of the leading edge of impeller 203 adjacent to injection port 230. The low pressure zone may induce gas to flow from inlet conduit 210 through second chamber 236 and then to the impeller 203 via injection port 230. The path through second chamber 236 may enable the flow of gas through the compressor 202 to be increased at high mass flow conditions when compared to a compressor without injection port 230. In this way, the additional flow of gas may enable more gas to be delivered to the compressor 202 before the compressor chokes and/or may relieve choked flow.

The movable sleeve 206 may be adapted to circumferentially surround the casing 205 and separates the first chamber 234 from the second chamber 236. The movable sleeve 206 is a cylindrical structure with a first end 240 and a second end 242 that both curve inward towards the central axis 208 so that a central portion 244 of the movable sleeve 206 is spaced away from the outer surface of the casing 205. The inner surface of the movable sleeve 206 may also include ribs 246 arranged along the central portion 244 that projects into the first chamber 234. The ribs may contact the casing 205 to maintain alignment of sleeve 206 concentric with casing 205.

The first chamber 234 is formed from the space between the movable sleeve 206 and the casing 205 and may be smaller than the second chamber 236. Specifically, the inner volume of the first chamber 234, which is further reduced by the arrangement of the ribs 246 within, as well as the length, diameter, and circumference of the first chamber 234, may each be smaller than those of the second chamber 236. The inner volume of the first chamber 234 may also be smaller than the inner volume of the casing 205, thus the amount of air that may flow through the first chamber may be less than the amount flowing through the inner channel 214 of the casing 205. In comparison, the second chamber 236 may have an inner volume greater than that of the first chamber 234 but less than the inner volume of the casing 205, allowing less air to flow through the second chamber than through the inner channel 214, at least during some conditions.

Air flow may be directed through either the first chamber 234 or second chamber 236 by varying the position of the movable sleeve 206 relative to the casing 205. The movable sleeve 206 may be configured to extend axially along the central axis 208 so that the first end 240 of the movable sleeve 206 is upstream of the first end 224 of the casing 205. The second end 242 of the movable sleeve 206 may alternate between aligning with the injection port 230, as shown in FIG. 2A, and aligning with the bleed port 228, as shown in FIG. 2B, when actuated to move according to engine operations. As the movable sleeve 206 is shifted axially, the second end 242 slides along the outer surface of the casing 205 and seals either the bleed port 228 or injection port 230, blocking flow between the inner channel 214 and either the first chamber 234 or second chamber 236, respectively.

In this way, the movable sleeve 206, in combination with the active casing treatment 204, may prevent both compressor surge and choke by enabling air flow through channels disposed at the downstream end of the casing 205 in the inlet conduit 210, adjacent to the impeller 203. The shape of the movable sleeve 206 with the second end 242 curving inwards towards the casing 205 allows the second end 242 to be in face-sharing contact with the outer surface of the casing 205. For example, the second end 242 includes a face that extends in a cylinder coaxially with the axis 208 that contacts (e.g., shares a face with) the outer surface of casing 205. The face is sized to block the fluidic coupling between injection port 230 and second chamber 236 when movable sleeve 206 is in the first position shown in FIG. 2A, or to block the fluidic coupling between bleed port 228 and first chamber 234 when movable sleeve 206 is in the second position shown in FIG. 2B. In this way, the movable sleeve 206 is able to alternate between sealing bleed port 228 or injection port 230 when positioned accordingly. The adjustment of the movable sleeve 206 specific to each of a lower and upper limiting boundary of compressor operation is further described below.

The movable sleeve 206 may be moved to the position shown in FIG. 2A where the second end 242 is blocking the injection port 230 for compressor operation at or outside of the lower surge limit (e.g., to the left of the surge limit) as according to the compressor map shown in FIG. 9. As a non-limiting example, operating the engine at relatively high loads and low engine speeds may lead to the compressor 202 operating at the surge limit or within the surge region. Pressure may accumulate at the outlet end of the compressor 202 and force a reversal in air flow. This reversal may cause degradation of the turbocharger and pressurized air may be violently vented out through the inlet conduit 210, accompanied by loud vibrations.

To alleviate the formation of a high pressure zone, air may be recirculated through the first chamber 234, as indicated by arrows 248, in a direction opposite of flow through the inner channel 214. Air flows from the region adjacent to the impeller 203 through the bleed port 228, to return to the first end 224 of the casing 205. The air flow then proceeds to re-enter the inner channel 214, flowing once again to the impeller 203. The bleed port 228 thus acts as a vent to "bleed" excess pressure accumulating at the outlet end of the compressor 202 upon operating below the compressor's surge limit. The arrangement of the leading edge of the sleeve 206 restricts and dampens oscillations in the surge flow so that noise is minimized and redirected into the compressor rather than projecting upstream to the atmosphere.

The relatively narrow bleed port 228 and small inner volume of the first chamber 234 in comparison to the inner channel 214 of the casing 205 may constrain flow through the first chamber 234 to a small portion of the total air flow through the compressor 202. In one example, when the movable sleeve 206 is adjusted to open the bleed port 228 and close the injection port 230, 5% of the air flowing to the impeller 203 is recirculated through the bleed port. As another example, the fraction of flow recirculated through the bleed port 228 may be 2%, 10% or 15% of the total flow through the compressor. Flow is further restricted through the first chamber 234 by the incorporation of the ribs 246 in the path of flow. During certain engine operations, e.g., cruising or accelerating, the bleed port 228 remains open and maintains a pressure equilibrium across the compressor by enabling the slow and constant recirculation of air.

In contrast, during conditions that push the compressor to approach or surpass the choke limit, the movable sleeve 206 is actuated to the position shown in FIG. 2B. Conditions leading to turbocharger choke may include sudden increases in engine load, a degraded wastegate, engine/turbocharger mismatch, etc. With the bleed port 228 sealed by the second end 224 of the movable sleeve 206, recirculation of air via the first chamber 234 is blocked. Air enters inlet conduit 210, flowing through inner channel 214 to the impeller 203, with an additional amount of air delivered to the region adjacent to the impeller 203 via the second chamber 236 (following arrows 250) and the injection port 230. The injection port 230 is located in a region that often experiences low pressure during high flow and the low pressure assists in drawing air into the second chamber 236 towards the injection port 230. Furthermore, the second chamber 236 has a larger inner volume than the first chamber 234, as described above, and the width of the injection port 230 may be configured so that enough extra air may be channeled through the second chamber 236 and injection port 230 to efficiently deliver the demanded airflow to the intake manifold of the engine.

By providing an alternate pathway via the second chamber 236 and injection port 230 that is separate from the surge recirculation route (comprising the bleed port 228 and first chamber 234), faster and higher volume air flow to mitigate turbocharger choke is enabled during compressor operation at or beyond a pre-set choke limit. The sonic speed of air flowing through inner channel 214 of the compressor 202 that often leads to compressor choke may be alleviated by providing additional airflow to the region adjacent to the impeller 203 in a same direction as flow through the inner channel 214 of the casing 205. Together, the active casing treatment 204 and movable sleeve 206 of FIGS. 2A-2B improve the efficiency and performance of the compressor 202 by extending the surge and choke limits as well as the experience of vehicle passengers by reducing noise during light engine loads.

Figure 3:
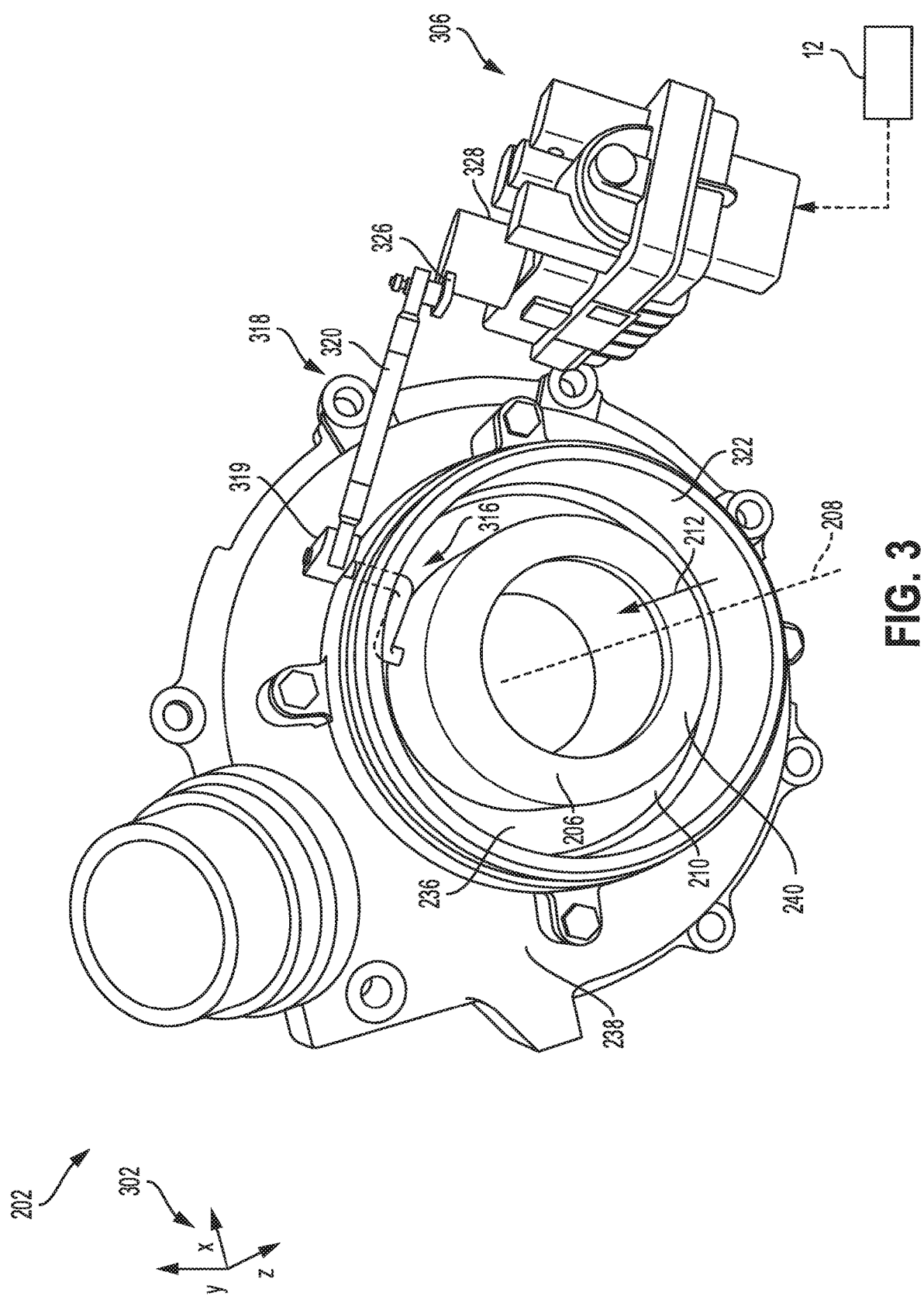
FIG. 3 shows an isometric perspective view of a compressor inlet with a movable sleeve connected to a rotary actuator.

The adjustment of the movable sleeve described above to align with elements of the active casing treatment may be accomplished by coupling the movable sleeve with an actuating device. An example of such a device is illustrated in FIG. 3, showing the compressor 202 of FIGS. 2A-2B adapted with a rotary actuator 306 coupled to the movable sleeve 206. Elements in common with those of FIGS. 2A-2B are similarly numbered. The movable sleeve 206 includes a central axis 208 which may also be a central axis of the compressor 202 about which the impeller (not shown in FIG. 3) may be rotatable (e.g., the central axis 208 is the axis of rotation of the impeller). The direction of air flow into inlet conduit 210 of compressor 202 is shown by the arrow 212. A set of reference axes 302 is provided for comparison between views shown in FIGS. 3-7B, indicating a "y" vertical direction, "x" horizontal direction, and "z" lateral direction.

The movable sleeve 206 may be a cylindrical shell configured to surround the casing (not shown in FIG. 3) within the inlet conduit 210 of compressor 202. A length of the movable sleeve 206, as defined in the lateral direction of reference axes 302, extends axially along the inlet conduit 210. The moveable sleeve is spaced away from an inner surface of the compressor housing 238 which circumferentially surrounds both the inlet conduit 210 and the movable sleeve 206. The space between the inner surface of the compressor housing 238 and an outer surface of the movable sleeve 206 forms the second chamber 236 that allows additional air flow to be delivered to the impeller during high load engine operations. As such, the movable sleeve 206 may be adjusted to block flow through the bleed port of the active casing treatment and allow flow through the injection port. A space between an inner surface of the movable sleeve 206 and the casing may define the first chamber, through which recirculation of flow, in a direction opposite of the air flow indicated by arrow 212, may occur during light engine loads via the bleed port. The inner surface of the movable sleeve 206 may include rib structures to center the sleeve around the housing while creating the space allowing airflow to occur. In one example, the structures may be the ribs 246 shown in FIGS. 2A-2B. The arrangement of the first end of the sleeve 240 restricts and dampens oscillations in the surge flow so that noise is minimized and redirected into the compressor rather than projecting upstream to the atmosphere. The outer surface of the movable sleeve 206 may be attached to a linkage 318 of the rotary actuator 306. The rotary actuator 306 may be arranged external to the inlet conduit 210 of the compressor 202 and adjacent to the inlet end 322 of the compressor housing 238, spaced away from the inlet end 322 by a length of the linkage 318. The linkage 318 may include a first branch 316, a second branch 319, a third branch 320, and an arm 326 that is coupled to a motor 328 of the rotary actuator 306. The first branch 316 may include a plurality of sections arranged in an alternating pattern of perpendicular alignment and couples to an outer surface of the movable sleeve 206. The first branch 316 may extend through the inlet end 322 of the compressor housing 238 via an aperture in the inlet end 322 with a portion of the first branch 316 protruding outside of the compressor housing 238. The first branch is constrained to rotate about an axis perpendicular to central axis 208 which traverses from inside to outside of the compressor housing 238. An end of the first branch 316 of the linkage 318 that protrudes outside of the compressor housing 238 connects to a first end of the second section branch 319. The second branch 319 is arranged entirely outside of the compressor housing 238. The second branch 319 rotates about the same axis as branch 316 and couples at a second end to the third branch 320 that extends in a direction away from the inlet end 322 of the compressor housing 238, approximately perpendicular to the central axis 208. In another embodiment, branch 320 may extend in a different direction such as toward the inlet end 322. The third branch 320 is also entirely outside of the compressor housing 238. The third branch 320 connects at one end to an arm 326 that is connected to a motor 328 of the rotary actuator 306. The motor 328 is configured to rotate the arm 326 to vary the position of the attached movable sleeve 206. The pivoting of the arm 326 may translate to both an axial and rotational movement of the movable sleeve 206 via the linkage 318 and is explained in further detail in the following descriptions of FIGS. 4A-4B.

Side views of the inlet conduit 210 of the compressor 202 are illustrated in FIGS. 4A-4B. Components common to compressor 202 of FIGS. 2A-3 are similarly numbered. The inlet conduit 210 is surrounded by the inlet end 322 of the compressor housing. An outer surface 404 of the movable sleeve 206 in FIGS. 4A-4B is shown attached to a pin 412 of the first branch 316 of the linkage 318. A first end of the pin 412 may be inserted into a hole in the outer surface 404 of the movable sleeve 206, thereby fixing the first end of the pin 412 to the movable sleeve 206. The pin 412 may include a surface shape such as a portion of a sphere in order to appropriately couple with the movable sleeve 206. In addition to the pin 412, the first branch 316 may also include a second section 414 and a stem 416. The pin 412 of first branch 316 extends outwards from the movable sleeve 206 in a direction perpendicular to the central axis 208. A second end of pin 412 is coupled to a first end 413 of the second section 414 of the first branch 316.

The second section 414 is perpendicular to the pin 412 and may extend along a length of the movable sleeve 206, the length being defined in the direction of flow as indicated by arrow 212. The second section 414 is positioned so that the first end 413 is downstream, along the outer surface 404 of the movable sleeve 206, of a second end 415. As such, the pin 412 is arranged downstream of the stem 416 of the first end 316 of the arm 318.

The second end 415 of the second section 414 couples to the stem 416 which is parallel with the pin 412 of the first branch 316. The stem 416 of the first branch 316 extends outwards and away from the outer surface 404 of the movable sleeve 206 so that a portion of the stem 416 is inside the inlet end 322 of the compressor housing and a portion is outside of the inlet end 322. An end of the stem 416 that is external to the inlet end 322 is connected to the second branch 319 by a first hinge 408. The first hinge 408 may be a fixed connection point between the first branch 316 and second branch 319. Specifically, an angle 420 formed by the second branch 319 and the second section 414 of the first branch 316 is rigid and does not vary as the linkage 318 is pivoted by the rotary actuator 306. The angle 420 may be any appropriate angle depending on the dimensions and placement of the linkage 318 and the movable sleeve 206. In contrast, the second branch 319 may couple to the third branch 320 at a second hinge 410 that is not rigid. In other words, an angle formed between the third branch 320 and second branch 319 may change as the linkage 318 is pivoted.

The movable sleeve 206 in FIG. 4A is depicted in a position that may close the bleed port and allow flow through the injection port, corresponding to the second position shown in FIG. 2B of the movable sleeve and hereafter will be referred to as a second position (e.g., open for flow during turbocharger choke). When the linkage 318 is pivoted to a first position as shown in FIG. 4B and corresponding to the first position shown in FIG. 2A of the movable sleeve, where the bleed port is open to flow and the injection port is blocked, the third branch 320 shifts in a direction indicated by arrow 418 illustrated in FIG. 4A. This motion results in the tilting of the second branch 319 so that an upstream end of the second branch 319 is above the central axis 208 which in turn pivots the first branch 316 at the rigid first hinge 408 so that the pin 412 of the first branch 316 swings downwards through an arc, indicated by arrow 420. The attachment of the pin 412 to the outer surface 404 of the movable sleeve 206 results in rotation of the movable sleeve by a distance 422 in a direction perpendicular to the central axis 208 and an axial shift by a distance 424 in a downstream direction coaxial with the central axis 208. The movable sleeve 206 is thus actuated from the second position shown in FIG. 4A to the first position shown in FIG. 4B.

To move the movable sleeve 206 from the first position (FIG. 4B) to the second position (FIG. 4A), the linkage 318 may be pivoted so that the third branch 320 shifts downwards in the direction indicated by arrow 426. This translates into swinging the pin 412 of the first branch 316 through an upwards arc indicated by arrow 428. The movable sleeve 206 is shifted rotationally by the distance 422 and axially by the distance 424 in opposite directions from the movements described for FIG. 4A, thus actuated to the second position.

The motion of the rotary actuator 306 is shown in additional detail in FIGS. 6A-6B. A first schematic 600 depicts a top view of the movable sleeve 206 and rotary actuator 306 adjusted to the second position and a second schematic 650 represents a top view of the movable sleeve 206 and rotary actuator 306 in the first position. Direction of air flow through the movable sleeve is indicated by arrow 212. The movable sleeve 206 has the central axis 208 and is attached to the first branch 316 of the linkage 318 via a first end (e.g., the pin 412 of the first branch 316 of FIGS. 4A-4B). The linkage 318 links the movable sleeve 206 to the rotary actuator 306.

The rotary actuator 306 may be coupled to the arm 326 through the motor (not shown in FIGS. 6A-6B) which pivots the arm 326. A first end 602 of the arm 326 is connected to the motor and forms a joint that is an axis about which the arm 326 may be pivoted/rotated along the plane formed by the horizontal direction and lateral direction, with respect to the set of reference axes 302. A second end 603 of the arm 326 couples to the third branch 320. To shift the movable sleeve 206 from the second position of FIG. 6A to the first position of FIG. 6B, the second end 603 of the arm 326 may rotate in the direction indicated by arrow 604 of FIG. 6A, driving a linear motion of the third branch 320 in the direction shown by arrow 418 of FIG. 6A. The third branch 320 is coupled to the second branch 319 at the second hinge 410. The second branch 319 and first branch 316, arranged at a fixed angle, pivot about first hinge 408 so that the end of the first branch 316 that is attached to the movable sleeve 206 swings through an arc indicated by arrow 420. The movable sleeve 206 shifts rotationally by distance 422 and downstream axially by distance 424, as described above, into the first position shown in FIG. 6B. To actuate the movable sleeve 206 from the first position to the second position (e.g. from the configuration of FIG. 6B to the configuration of FIG. 6A), the rotary actuator 306 may pivot the arm 326 at the first end 602 through the arc shown by arrow 606 of FIG. 6B to slide the third branch 320 in the direction indicated by arrow 426, thereby swinging the first branch 316 through the arc shown by arrow 428.

First and second schematics 600 and 650 show that an angle between the arm 326 and the third branch 320 as well as an angle between the third branch 320 and the second branch 319 may vary as the arm 316 is pivoted by the rotary actuator 306. The angle between the second branch 319 and the first branch 316 is fixed, however, which enables the translation of the pivoting of the arm 326 into the swinging of the first branch 316 of the linkage 318, which is further converted to the rotational and axial shifting via a single actuation motion of the movable sleeve 206.

The positioning of the first branch 316 of the linkage 318 with respect to the movable sleeve 206 and inlet conduit 210 is shown from a front section view in FIG. 5. The first branch 316 is attached to the outer surface 404 of the movable sleeve 206 at the pin 412 (not shown in FIG. 5). The inlet end 322 of the compressor housing has an inner surface 402 and the space between the inner surface 402 and an outer surface 404 of the movable sleeve 206 forms the second chamber 236.

The movable sleeve 206 circumferentially surrounds the casing 205 which may include the active casing treatment as described above with respect to FIGS. 2A-2B, at a downstream end of the casing 205. The first chamber 234 is formed in the space between the inner surface of the movable sleeve 206 and the outer surface of the casing 205 and has an inner volume smaller than either an inner volume of the second chamber 236 or the inner channel 214 of the casing 205. Ribs 246 protrude into the first chamber 234 from the inner surface of the movable sleeve 206.

The attachment of the pin 412 to the outer surface 404 of the movable sleeve 206, the rigid coupling of the first branch to the second branch of the linkage 318, as well as an alignment of the linkage 318 with respect to the movable sleeve 206, enables both an axial and a rotational adjustment of the movable sleeve 206 in a single actuating motion. The positioning of the stem 416 of the first branch 316, represented by a dashed line 407, is offset from a bisecting line 405 (dividing the inlet conduit 210 in half) by a distance 409, defined in a direction perpendicular to the bisecting line 405. In one position, such as the position of the linkage 318 shown in FIG. 4A, the pin 412 may be aligned to the left of the bisecting line 405 by an amount approximately equal to one half of the rotational distance 422. In a second position, such as the position of the linkage 318 shown in FIG. 4B, the pin 412 may be aligned to the right of bisecting line 405 by an amount approximately equal to one half of the rotational distance 422. In this way, the depth of engagement of pin 412 into sleeve 206 is similar at both selectable positions.

The movable sleeve 206 of FIGS. 2A-6B may also be adapted to move via actuating mechanisms other than the rotary actuator shown. For example, as illustrated in FIGS. 7A-7B, a first schematic 700 top-down view of the movable sleeve 206, shows the movable sleeve 206 coupled to a linear actuator 702 in the second position. A second schematic 750 of the movable sleeve 206 and linear actuator 702 depicts the movable sleeve 206 in the first position. Flow through the movable sleeve 206 is indicated by arrow 212 and the central axis 208 is included in both the first schematic 700 and second schematic 750.

The linear actuator 702 may be positioned external to the inlet conduit, above the movable sleeve 206 with the body of the linear actuator 702 upstream of the moveable sleeve 206, and offset from central axis 208. A motor 704 of the linear actuator 702, and a retractable arm 706, extending out from the motor 704, are parallel with the central axis 208. The linear actuator 702, similar to the rotary actuator of FIGS. 6A-6B, may include the linkage 318 configured with the first branch 316, second branch 319, and third branch 320. The second branch 319 and third branch 320 may be arranged outside of the inlet conduit while the first branch 316 may extend through the compressor housing.

The first branch 316 is attached to the movable sleeve 206 at one end and may extend through the compressor housing so that a portion of the first branch 316 protrudes outside of the compressor housing. The end of the first branch 316 that that is outside of the compressor housing is coupled to the second branch 319 by the first hinge 408 so that the angle between the first branch 316 and second branch 319 is constant. The second branch 319 of the linkage 318 is coupled to the third branch 320, both of which may be arranged outside of the compressor housing.

The retractable arm 706 may connect the third branch 320 to the motor 704. The retractable arm 706 and the third branch 320 may be coupled so that the angle between the retractable arm 706 and third branch 320 is not fixed. The motor 704 activates a linear motion of the retractable arm 706 that is parallel with the central axis 208. For example, to actuate the movable sleeve 206 from the open position, shown in FIG. 7A, to the closed position of FIG. 7B, the motor 704 may retract the retractable arm 706 in a direction indicated by arrow 708. The movement of the retractable arm 706 results in the shifting of the third branch 320 also in the direction of arrow 708. The change in position of the third branch 320 may pull the second branch 319 at an end connected to the third branch 320 so that the end of the second branch 319 rotates upwards, indicated by arrow 710 of FIG. 7A. The first branch and second branch 319, connected at the first hinge 408, may pivot as a single unit about the first hinge 408 and swing the first branch 316 through the arc shown by arrow 712. The curved motion of the first branch 316 results in the shifting of the attached movable sleeve 206 by the rotational distance 422 and the axial distance 424 in a downstream direction.

To actuate the movable sleeve 206 from the closed position to the open position, e.g., from the position of FIG. 7B to the position of FIG. 7A, the linear actuator 702 may activate the motor 704 to extend the retractable arm 706 in a direction shown by arrow 714 of FIG. 7B. The third branch 320 is also shifted in the direction of arrow 714, thereby pivoting the end of the second branch 319 that is connected to the third branch 320 as indicated by arrow 716. The first branch 316 is thus pivoted in an upwards direction along an arc shown by arrow 718, resulting in the rotation of the movable sleeve 206 by the distance 422 and movement through an axial distance 424 in an upstream direction.

In the examples of FIGS. 7A-7B, the linkage 318 may have the first branch 316, second branch 319 and third branch 320 similar to the linkage of the rotary actuator shown in FIGS. 6A-6B. The orientations of the branches of the linkage 318, however, may differ due to the partially upstream arrangement of the linear actuator 702 above and aligned along the length of the movable sleeve 206 instead of beside the movable sleeve as for the rotary actuator. In the first and second schematics 700 and 750 showing the linear actuator 702, the retractable arm 706 and third branch 320 are nearly coaxial but are not fixed with respect to the angle formed between the retractable arm 706 and third branch 320. In the first and second schematics 600 and 650 of the rotary actuator 306, however, the arm 326 pivots so that the angle of the arm 326 relative to the third branch varies from an acute angle, as shown in FIG. 6A, to an obtuse angle, shown in FIG. 6B. The rotary actuator 306 of FIGS. 3-6B and linear actuator 702 of FIGS. 7A-7B both enable the rotational and axial displacement of the movable sleeve 206 and the optional positioning of the actuator may accommodate different allowances in available space around the compressor housing. Other arrangements of the position of a rotary or linear actuator are possible and may be selected based on the available space for packaging an actuator proximate the compressor housing.

In this way, a movable sleeve may be adjusted to either allow recirculation flow during light engine loads or to enable additional delivery of air to an impeller when a compressor is operating under high loads. The position of the movable sleeve shown in FIGS. 4A, 6A, and 7A may correspond to the actuation of a linkage connecting the movable sleeve to an actuator during high engine loads with the movable sleeve 206 positioned to block flow through a bleed port, arranged upstream of an injection port of an active casing treatment. The injection port is thus open to flow of air through a second chamber in a same direction as the flow into an inlet conduit of the compressor. Upon receiving a signal from a controller, for example, during reduced engine load, the linkage of the actuator may shift the movable sleeve an axial distance as well as a rotational distance. Flow through the injection port is blocked while the bleed port is opened so that air may be channeled from a region adjacent to the impeller back into the inlet conduit in a direction opposite of flow through the inlet conduit. The rotational distance that the movable sleeve travels with each adjustment of position may prevent the binding of the movable sleeve to a casing, in which the active casing treatment is arranged, in the event that material accumulates between the movable sleeve and casing over time.

Turbocharger compressors may operate according to an operating map of compressor pressure ratio as a function of mass flow rates such as the compressor map 900 shown in FIG. 9. The X axis represents flow rate, and the Y axis represents pressure ratio, or the output pressure divided by input pressure. At the left side of the map, the surge line, denoted by dashed line 902, or surge limit, represents where the compressor operation may lose stability and exhibits surge behavior ranging from whoosh noise to violent oscillations of flow. At the right side of the map, the compressor is limited by choked flow conditions at the inlet to the compressor, as shown by dashed line 904 representing the choke line or choke limit. Operation to the left may be extended by including a bleed port in the compressor casing just downstream of the leading edge of the compressor wheel. Under low flow conditions, this port allows some air flow to recirculate outside the main flow path to a point further upstream and later be reintroduced to the compressor. With proper flow channeling, this recirculating flow is quieter than recirculating flow that would occur near the surge limit without the bleed port. Under high flow conditions, air flow may be circulated through a different port in the casing further downstream of the typical bleed port. This second port (injection port) is in an area known to experience relatively low air pressure during high flow conditions which allows additional air to flow forward into the compressor wheel when the normal flow is nearly choked. This injection port may be blocked to prevent backward (recirculating) flow from occurring at other operating points on the map, otherwise decreased compressor efficiency may result. Thus, the moveable sleeve described herein allows the injection port to be selectively covered or exposed while also allowing a flow path for the bleed port that minimizes noise projecting upstream in the air path.

The present disclosure describes a compressor casing with two ports—one for surge, one for choke—along the compressor wheel. A thin cylindrical section of the casing extends upstream from the compressor wheel. The ports are circumferential in the casing except for a limited number of spokes or supports to carry the material upstream of each port. A sleeve is installed surrounding the protruding cylinder casing. In a first position, the sleeve includes features to cover the injection port and to direct the surge recirculation flow from the bleed port to an upstream location pointed back toward the compressor wheel. In the second position, the sleeve is moved enough to expose the injection port and may cover the bleed port. In order to prevent binding, the sleeve may rotate at the same time as the sleeve moves axially. The mechanism to provide this motion includes a linkage through the turbocharger compressor housing. The linkage moves a first end of the linkage through an arc. The first end of the linkage is fixed to the sleeve such that as the first end sweeps through the arc, it rotates and translates the sleeve.

Turning to FIG. 8, a flow chart of a method 800 for controlling operation (e.g. controlling a flow through and a position) of an active casing treatment in combination with a movable sleeve arranged in an inlet conduit of a compressor is shown. Specifically, the active casing treatment may be active casing treatment 204 and the movable sleeve may be movable sleeve 206 of FIGS. 2A-2B. The movable sleeve may circumferentially surround a casing in which the active casing treatment is disposed and the movable sleeve and casing may be positioned in an inlet conduit of a compressor, as shown in FIGS. 2A-2B, upstream of an impeller. A first chamber, fluidly coupled to a bleed port of the active casing treatment, may be formed from the space between an outer surface of the casing and an inner surface of the movable sleeve. Air may recirculate, when the bleed port is open, from a region adjacent to the impeller through the bleed port and first chamber to the inlet conduit. A second chamber, fluidly coupled to an injection port of the active casing and formed from the space between an outer surface of the movable sleeve and an inner surface of a compressor housing, may allow additional air flow to be delivered to the impeller region when the injection port is open. Instructions for carrying out method 800 and the rest of the methods included herein may be executed by a controller (e.g., controller 12 shown in FIG. 1) based on instructions stored on a memory of the controller and in conjunction with signals received from sensors of the engine system, such as the sensors described above with reference to FIG. 1. The controller may employ engine actuators of the engine system to adjust engine operation, according to the methods described below. For example, the controller may employ an actuator of the movable sleeve to adjust the position of the movable sleeve so that either the bleed port or injection port is open to air flow, as shown in FIGS. 2A-2B. An example of such an actuator is shown in FIG. 3, as described above and the operation of the movable sleeve and active casing treatment via the actuator is described in the method below.

At 802, the method includes estimating and/or measuring engine operating conditions. Engine operating conditions may include engine speed, engine load, intake air mass flow, engine temperatures (such as engine coolant temperature), intake manifold pressure, a pressure differential across the compressor, a position of the movable sleeve, etc. At 804, the method includes determining whether current compressor operation is below a surge threshold. Current compressor operation below a surge threshold may be determined based on a current (e.g., currently determined) engine load and engine speed being below a surge line or threshold. For example, a map of engine load vs. engine speed or a look-up table may be stored in a memory of the controller. The controller may determine the current engine speed (based on a profile ignition pickup signal from Hall effect sensor 120 of FIG. 1, for example) and engine load (based on output from MAP sensor 124, the pedal position signal, and/or other parameters) and then look up whether this operating point is above or below the surge threshold. In one example, the surge threshold may be a pre-set surge threshold stored in the map or look-up table.

In another example, compressor operation below a surge threshold may be determined according to a compressor map that plots compressor pressure ratio as a function of compressor mass flow. For example, referring to FIG. 9, the surge limit is represented by dashed line 902. The surge threshold may be defined as a line on the compressor map that represents 20% more flow than the flow at the surge limit line. The area to the left of dashed line 902 is a region where the compressor operates below a surge limit that encompasses a range of pressure ratios relative to flow rate that are lower than the minimum flow rate for stable compressor operation. Operating near the surge limit results in inefficient compressor operation and in some cases unfavorable noise. Setting a surge threshold above the surge limit allows some margin and may prevent operation in an unfavorable region of the compressor map.

Additionally, as used herein, the compressor operating below the surge threshold may include the compressor operating to the right of a surge limit, as shown in FIG. 9 and explained above, but within a threshold range of the surge limit (e.g., within a threshold mass air flow of the surge limit). Further, the compressor may operate with the movable sleeve adjustable to open flow through the bleed port in the first position for a range of compressor operating conditions until the choke limit is approached.

If the compressor is operating below the surge threshold, the method continues to 806 to adjust the movable sleeve to a first position that opens the bleed port. Adjusting the movable sleeve may include the controller sending an electronic signal to an actuating mechanism of the movable sleeve to either slide the movable sleeve from a position where the injection port is open (and the bleed port is closed, referred to as the second position of the movable sleeve) to the first position where the bleed port is open, or to maintain the movable sleeve in the first position where the bleed port remains open. The arrangement of the movable sleeve so that the bleed port is open is shown in FIGS. 2A and 4B, as described above. As explained above with reference to these figures, when the bleed port is open, pressure at an outlet end of the compressor (as defined as downstream of a leading edge of the compressor impeller) is alleviated by allowing flow from the impeller region through the bleed port and first chamber to return flow to the inlet conduit, as indicated at 808 of FIG. 8. The first chamber may be adapted with elements, such as first end 240 of the movable sleeve 206 shown in FIGS. 2A-2B, to reduce noise and dampen oscillations during surge flow, e.g., flow through the first chamber in the opposite direction of flow through the inlet conduit. By adjusting the movable sleeve to open the bleed port and close the injection port, the surge limit of the compressor may be shifted such that more engine operating points may be outside of the surge region and noise is suppressed.

Alternatively at 804, if the engine is operating above the surge threshold, the method proceeds to 810 to determine whether turbocharger operation is above a choke threshold. Turbocharger choke may occur when the engine experiences high loads and speeds, high air flow, or other parameters leading to air flow into the compressor above the tolerance of the turbocharger (e.g., above the amount of air flow the compressor is physically adapted to flow). During choke, air velocity entering the compressor wheel may nearly reach the speed of sound, preventing any increase in airflow. Input from various sensors as described above for detection of compressor surge may also be used to evaluate whether compressor operation exceeds a choke threshold (e.g., engine speed and load, compressor mass flow and pressure ratio). The choke threshold may also be a pre-set threshold stored in a map of engine load vs. engine speed, compressor ratio vs. mass flow, or in a look-up table. For example, referring to FIG. 9, the choke threshold or choke limit is delineated by dashed line 904. The region to the right of dashed line 904 represents conditions exceeding the choke threshold. If the turbocharger is determined to be operating below the choke threshold (e.g., to the left of the choke threshold), method 800 proceeds to 806 such that the controller may send a signal to the actuating mechanism to adjust the movable sleeve so that the bleed port is open or remains open and the routine continues to 808.

If the controller determines that compressor operation exceeds the choke threshold (e.g., the compressor is operating to the right of the choke line of FIG. 9), the method continues to 812 where the movable sleeve is actuated to the second position to open the injection port and close the bleed port. Additionally, as used herein, the compressor operating above the choke threshold may include the compressor operating to the right of a choke limit, as shown in FIG. 9 and explained above, but within a threshold range of the choke limit (e.g., within a threshold mass air flow of the choke limit). Further, in some examples, the movable sleeve may be adjusted to open the injection port when compressor operation nears the choke limit but the compressor is not operating in the choke region, e.g., if the compressor mass flow and pressure ratio are within 5 or 10% of the choke threshold.

At 814, air flows from the inlet conduit to the impeller region by way of the second chamber and injection port. This enables additional air flow to be delivered to the impeller of the compressor, thereby reducing the velocity of air flowing into the leading edge of the compressor wheel which reaches nearly the speed of sound during choke. The second chamber does not include noise suppression structures and thus does not restrict flow.

After enabling flow through the injection port of the active casing treatment, the method proceeds to 816 to determine whether turbocharger operation is still above the choke threshold. If the choke threshold is still exceeded, the method returns to 812 to maintain the movable sleeve in the second position where the injection port is open to flow. If, however, engine operation falls below the choke threshold, the routine continues to 818 to adjust the movable sleeve to the first position to open the bleed port and allow recirculation of air through the first chamber to return to the inlet conduit. In some examples, the controller may maintain the movable sleeve in the second position until the turbocharger operation is below the choke threshold by a suitable amount, such as 5 or 10% below the choke threshold.

In this way, a movable sleeve coupled with an active casing treatment positioned within an inlet conduit of a compressor and upstream of an impeller of the compressor may be used to adjust the flow through the inlet conduit. The movable sleeve circumferentially surrounds a casing, in which the active casing treatment is disposed, and is itself surrounded by a compressor housing. The movable sleeve is spaced away from both the casing and the compressor housing, so that a first chamber is formed between the casing and the movable sleeve that is fluidly coupled to a bleed port in the active casing treatment. The first chamber may be adapted with noise suppressing structures such as restrictors or deflectors. A second chamber is formed from the space between the movable sleeve and the compressor housing. The second chamber is fluidly coupled to an injection port in the active casing treatment. In one example, the movable sleeve may be adjusted to allow flow through the bleed port but not the injection port when turbocharger operations (e.g., compressor mass flow and pressure ratio) are below a choke threshold and/or below a surge threshold. In this position, air flow is allowed to recirculate from the impeller to the inlet conduit via the bleed port and first chamber, relieving pressure accumulation at an outlet end of the compressor and extending the surge margin as well as dampening oscillations generated during surge flow. In another example, the movable sleeve may be adjusted to open flow through the injection port but not the bleed port, thereby alleviating a pressure gradient created during conditions (e.g., engine speeds and loads) exceeding a choke threshold. Additional flow is directed to the impeller via the second chamber and injection port. The technical effect of the adjusting the position of the movable sleeve, and hence flow through the compressor, is to extend the range of engine operating conditions in which the compressor is able to operate stably and with high efficiency.

FIGS. 1-7B show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

As one embodiment, a method includes flowing intake air in a first direction through a casing to an impeller of a compressor; selectively flowing intake air from the casing through a first chamber in an opposite, second direction, the first chamber circumferentially surrounding the casing; and selectively flowing intake air in the first direction through a second chamber to the impeller, the second chamber circumferentially surrounding the first chamber. In a first example of the method, the casing circumferentially surrounds at least part of the impeller, and wherein selectively flowing intake air from the casing through the first chamber comprises selectively flowing intake air from the casing to the first chamber via a bleed port of the casing. A second example of the method optionally includes the first example and further includes wherein selectively flowing intake air in the first direction through the second chamber to the impeller comprises selectively flowing intake air in the first direction through the second chamber to the impeller via an injection port of the casing. A third example of the method optionally includes one or more of the first and second examples, and further includes, wherein selectively flowing intake air from the casing through the first chamber via the bleed port comprises actuating a movable sleeve to a first position based on a mass air flow through the casing being below a threshold mass air flow, wherein while the movable sleeve is in the first position, the bleed port is open to the first chamber. A fourth example of the method optionally includes one or more of the first through third examples, and further includes, wherein selectively flowing intake air in the first direction through the second chamber to the impeller via the injection port comprises actuating the movable sleeve to a second position based on a mass air flow through the casing being above a threshold mass air flow, wherein while the movable sleeve is in the second position, the injection port is open to the second chamber.

As another embodiment, a compressor includes an impeller rotatable about a central axis and housed in a compressor housing; a casing at least partially surrounding the impeller, the casing including an injection port and a bleed port; and a movable sleeve circumferentially surrounding the casing and defining a first air flow chamber between an outer surface of the casing and an inner surface of the movable sleeve and a second air flow chamber between an outer surface of the movable sleeve and an inner surface of the housing, the movable sleeve configured to selectively block and unblock the injection port and the bleed port. In a first example of the compressor, the casing forms an inner channel fluidically coupling an inlet of the compressor to the impeller, and the bleed port fluidically couples the inner channel to the first air flow chamber and the injection port fluidically couples the inner channel to the second air flow chamber. A second example of the compressor optionally includes the first example and further includes wherein each of the first air flow chamber and the second air flow chamber are fluidically coupled to the inlet of the compressor. A third example of the compressor optionally includes one or more of the first and second examples, and further includes, wherein the movable sleeve is adjustable to a first position where the bleed port is open and the injection port is blocked, fluidically coupling the inner channel to the first air flow chamber such that intake air in the inner channel flows through bleed port and to the first air flow chamber. A fourth example of the compressor optionally includes one or more of the first through third examples, and further includes, wherein the movable sleeve is adjustable to a second position where the bleed port is blocked and the injection port is open, fluidically coupling the inner channel to the second air flow chamber such that intake air in the second air flow chamber flows through the injection port and to the impeller. A fifth example of the compressor optionally includes one or more of the first through fourth examples, and further includes, wherein the bleed port is located upstream of the injection port in an intake air flow direction through the compressor. A sixth example of the compressor optionally includes one or more of the first through fifth examples, and further includes support ribs coupled to the movable sleeve and projecting into the first air flow chamber. A seventh example of the compressor optionally includes one or more of the first through sixth examples, and further includes, wherein the movable sleeve includes an inwardly-curving downstream end and wherein the inwardly-curving downstream end includes a face configured to be in face-sharing contact with an outer surface of the casing. An eighth example of the compressor optionally includes one or more of the first through seventh examples, and further includes, wherein the face of the inwardly-curving downstream end is sized to block flow through either the bleed port or the injection port. A ninth example of the compressor optionally includes one or more of the first through eighth examples, and further includes, the movable sleeve including an inwardly-curving upstream end and the inwardly-curving upstream end restricts air flowing in the first air flow chamber and directs it toward the impeller.

As another embodiment, a system includes a compressor, comprising: a housing; an impeller housed within the housing and rotatable about a central axis; a casing at least partially surrounding the impeller and forming an inner channel fluidically coupling an inlet of the compressor to the impeller, the casing including an injection port and a bleed port; a movable sleeve circumferentially surrounding the casing; a first air flow chamber extending along an outer surface of the casing; and a second air flow chamber extending along an outer surface of the movable sleeve; an actuating mechanism coupled to the movable sleeve; and a controller storing instructions executable to: actuate the actuating mechanism to move the movable sleeve to a first position where the bleed port is open to the first flow chamber and the injection port is blocked responsive to compressor operation in a surge region; and actuate the actuating mechanism to move the movable sleeve to a second position where the bleed port is blocked and the injection port is open to the second air flow chamber responsive to compressor operation in a choke region. In a first example of the system, the actuating mechanism includes a linkage coupling a motor to the movable sleeve, wherein the motor is positioned outside the housing and the linkage traverses through the housing. A second example of the system optionally includes the first example and further includes wherein the bleed port is positioned in the casing upstream of the injection port in an intake air flow direction through the inner channel. A third example of the method optionally includes one or more of the first and second examples, and further includes wherein the injection port is positioned in the casing at a low-pressure region such that intake air in the second chamber flows through the injection port and to the impeller when the movable sleeve is in the second position. A fourth example of the method optionally includes one or more of the first through third examples, and further includes wherein the bleed port is positioned in the casing at a higher-pressure region such that intake air in the inner channel flows through the bleed port and to the first chamber when the movable sleeve is in the first position.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
    flowing intake air in a first direction through a casing to an impeller of a compressor via an inner channel;
    selectively flowing intake air from the casing through a first chamber in an opposite, second direction, the first chamber circumferentially surrounding the casing and the inner channel; and
    selectively flowing intake air in the first direction through a second chamber to the impeller, the second chamber circumferentially surrounding the first chamber.

2. The method of claim 1, wherein the casing circumferentially surrounds at least part of the impeller, and wherein selectively flowing intake air from the casing through the first chamber comprises selectively flowing intake air from the casing to the first chamber via a bleed port of the casing.

3. The method of claim 2, wherein selectively flowing intake air in the first direction through the second chamber to the impeller comprises selectively flowing intake air in the first direction through the second chamber to the impeller via an injection port of the casing.

4. The method of claim 3, wherein selectively flowing intake air from the casing through the first chamber via the bleed port comprises actuating a movable sleeve to a first position based on a mass air flow through the casing being below a threshold mass air flow, and wherein, while the movable sleeve is in the first position, the bleed port is open to the first chamber.

5. The method of claim 3, wherein selectively flowing intake air in the first direction through the second chamber to the impeller via the injection port comprises actuating a movable sleeve to a second position based on a mass air flow through the casing being above a threshold mass air flow, and wherein, while the movable sleeve is in the second position, the injection port is open to the second chamber.

6. A compressor, comprising:
    an impeller rotatable about a central axis and housed in a compressor housing;
    a casing at least partially surrounding the impeller, the casing including an injection port and a bleed port; and
    a movable sleeve circumferentially surrounding the casing and defining a first air flow chamber between an outer surface of the casing and an inner surface of the movable sleeve and a second air flow chamber between an outer surface of the movable sleeve and an inner surface of the housing, the movable sleeve configured to selectively block and unblock the injection port and the bleed port, wherein the first air flow chamber circumferentially surrounds an inner channel, and wherein the second air flow chamber circumferentially surrounds the first air flow chamber.

7. The compressor of claim 6, wherein the casing forms the inner channel fluidically coupling an inlet of the compressor to the impeller, and wherein the bleed port fluidically couples the inner channel to the first air flow chamber and the injection port fluidically couples the inner channel to the second air flow chamber.

8. The compressor of claim 6, wherein each of the first air flow chamber and the second air flow chamber is fluidically coupled to the inner channel of the compressor.

9. The compressor of claim 6, wherein the movable sleeve is adjustable to a first position where the bleed port is open and the injection port is blocked, fluidically coupling the inner channel to the first air flow chamber such that intake air in the inner channel flows through the bleed port and to the first air flow chamber.

10. The compressor of claim 6, wherein the movable sleeve is adjustable to a second position where the bleed port is blocked and the injection port is open, fluidically coupling the inner channel to the second air flow chamber such that intake air in the second air flow chamber flows through the injection port and to the impeller.

11. The compressor of claim 6, wherein the bleed port is located upstream of the injection port in an intake air flow direction through the compressor.

12. The compressor of claim 6, further comprising support ribs coupled to the movable sleeve and projecting into the first air flow chamber.

13. The compressor of claim 6, wherein the movable sleeve includes an inwardly-curving downstream end and wherein the inwardly-curving downstream end includes a face configured to be in face-sharing contact with the outer surface of the casing.

14. The compressor of claim 13, wherein the face of the inwardly-curving downstream end is sized to block flow through either the bleed port or the injection port.

15. The compressor of claim 6, wherein the movable sleeve includes an inwardly-curving upstream end and wherein the inwardly-curving upstream end restricts air flowing in the first air flow chamber and directs it toward the impeller.

16. A system, comprising:
a compressor, comprising:
a housing;
an impeller housed within the housing and rotatable about a central axis;
a casing at least partially surrounding the impeller and forming an inner channel fluidically coupling an inlet of the compressor to the impeller, the casing including an injection port and a bleed port;
a movable sleeve circumferentially surrounding the casing;
a first air flow chamber extending along an outer surface of the casing and circumferentially surrounding the inner channel; and
a second air flow chamber extending along an outer surface of the movable sleeve and circumferentially surrounding the first air flow chamber, wherein the inner channel is directly fluidically coupled to the second air flow chamber;
an actuating mechanism coupled to the movable sleeve; and
a controller storing instructions executable to:
actuate the actuating mechanism to move the movable sleeve to a first position where the bleed port is open to the first air flow chamber and the injection port is blocked responsive to compressor operation in a surge region; and
actuate the actuating mechanism to move the movable sleeve to a second position where the bleed port is blocked and the injection port is open to the second air flow chamber responsive to compressor operation in a choke region.

17. The system of claim 16, wherein the actuating mechanism includes a linkage coupling a motor to the movable sleeve, and wherein the motor is positioned outside the housing and the linkage traverses through the housing.

18. The system of claim 16, wherein the bleed port is positioned in the casing upstream of the injection port in an intake air flow direction through the inner channel.

19. The system of claim 18, wherein the injection port is positioned in the casing at a low-pressure region such that intake air in the second air flow chamber flows through the injection port and to the impeller when the movable sleeve is in the second position.

20. The system of claim 19, wherein the bleed port is positioned in the casing at a higher-pressure region such that intake air in the inner channel flows through the bleed port and to the first chamber when the movable sleeve is in the first position.

* * * * *